(12) United States Patent
Kudo

(10) Patent No.: US 11,698,618 B2
(45) Date of Patent: Jul. 11, 2023

(54) SAFETY CONTROLLER

(71) Applicant: Keyence Corporation, Osaka (JP)

(72) Inventor: Motohiro Kudo, Osaka (JP)

(73) Assignee: KEYENCE CORPORATION, Osaka (JP)

(*) Notice: Subject to any disclaimer, the term of this patent is extended or adjusted under 35 U.S.C. 154(b) by 253 days.

(21) Appl. No.: 17/066,501

(22) Filed: Oct. 9, 2020

(65) Prior Publication Data
US 2021/0149366 A1 May 20, 2021

(30) Foreign Application Priority Data

Nov. 19, 2019 (JP) ................................ 2019-209187

(51) Int. Cl.
G05B 19/406 (2006.01)
F16P 3/14 (2006.01)

(52) U.S. Cl.
CPC ............ *G05B 19/406* (2013.01); *F16P 3/144* (2013.01); *G05B 2219/50193* (2013.01)

(58) Field of Classification Search
CPC ......... G05B 19/406; G05B 2219/50193; F16P 3/144
See application file for complete search history.

(56) References Cited

U.S. PATENT DOCUMENTS

| | | | |
|---|---|---|---|
| 6,137,408 A | 10/2000 | Okada | |
| 6,204,575 B1 | 3/2001 | Yamaguchi | |
| 6,414,603 B1 | 7/2002 | Yamaguchi et al. | |
| 6,784,415 B2 | 8/2004 | Kudo et al. | |
| 6,894,623 B2 * | 5/2005 | Hama | G01V 8/20 250/221 |
| 7,411,319 B2 | 8/2008 | Suhara et al. | |
| 7,485,841 B2 | 2/2009 | Inoue et al. | |
| 7,696,469 B2 | 4/2010 | Inoue et al. | |
| 8,346,510 B2 | 1/2013 | Fukumura et al. | |
| 9,200,955 B2 | 12/2015 | Kawabata et al. | |
| 9,939,518 B2 | 4/2018 | Tagashira et al. | |
| 9,939,528 B2 | 4/2018 | Yamazaki et al. | |
| 9,973,701 B2 | 5/2018 | Yamazaki et al. | |

(Continued)

FOREIGN PATENT DOCUMENTS

JP 2009515265 A 4/2009

OTHER PUBLICATIONS

U.S. Appl. No. 17/066,491, filed Oct. 9, 2020 (65 pages).
U.S. Appl. No. 17/066,499, filed Oct. 9, 2020 (62 pages).
U.S. Appl. No. 17/066,503, filed Oct. 9, 2020 (70 pages).

*Primary Examiner* — Carlos Amaya
(74) *Attorney, Agent, or Firm* — Kilyk & Bowersox, P.L.L.C.

(57) ABSTRACT

The present invention provides a mechanism for causing a safety controller to suitably display various pieces of information from a safety input device. A safety controller acquires a compatible port that connects at least one safety input device, and a safety input signal from the at least one safety input device connected via the compatible port and state information on the safety input device. Further, the safety controller 3 includes the MCU 23 that generates, in accordance with the safety program, a safety output signal based on the safety input signal acquired, and the display device 5a that displays, based on the state information acquired, a state of the safety input device from which the state information is acquired.

19 Claims, 15 Drawing Sheets

(56) References Cited

U.S. PATENT DOCUMENTS

| | | |
|---|---|---|
| 9,976,700 B2 | 5/2018 | Kawanaka et al. |
| 10,174,880 B2 | 1/2019 | Kawanaka et al. |
| 2003/0029992 A1 | 2/2003 | Kudo et al. |
| 2009/0295577 A1 | 12/2009 | Yamaguchi |
| 2016/0259313 A1* | 9/2016 | Liu .......................... G06F 8/34 |
| 2017/0242111 A1* | 8/2017 | Tagashira ............ G08B 13/1968 |
| 2018/0294982 A1* | 10/2018 | Boemi .............. H04L 12/40032 |
| 2019/0316381 A1 | 10/2019 | Oh et al. |
| 2019/0316405 A1 | 10/2019 | Kashima et al. |
| 2020/0057423 A1 | 2/2020 | Babasaki et al. |

\* cited by examiner

SAFETY CONTROLLER

CROSS-REFERENCE TO RELATED APPLICATIONS

The present application claims foreign priority based on Japanese Patent Application No. 2019-209187, filed Nov. 19, 2019, the contents of which are incorporated herein by reference.

BACKGROUND OF THE INVENTION

1. Field of the Invention

The present invention relates to a safety controller.

2. Description of Related Art

Many industrial machines operate in a production factory that produces products (workpieces). A safety system is an essential system for securing the safety of humans against such industrial machines. In most cases, the safety system brings an industrial machine into emergency stop when a human enters an operating area of the industrial machine. Therefore, in the safety system, safety input devices that monitor an entry of an object such as a human are provided at various places in the operating area of the industrial machine. Examples of the safety input device include various types of devices such as a sensor such as a light curtain, a scanner, or a camera that detects an entry of an object, and a door switch that detects opening or closing of a door. Such safety input devices are connected to a safety controller that performs safety control on the safety system. The safety controller monitors safety input signals from the safety input devices and brings, as needed, the industrial machine into emergency stop.

As described above, the safety input device is an important device for securing the safety of humans in the safety system, and not only the safety input signal but also state information on the safety input device is of high importance. For example, a light curtain uses a plurality of light beams to provide a light beam barrier in a predetermined entry area, and, when the light beams are blocked by an object or the like, the amount of light received decreases, and an entry can be detected accordingly. Therefore, installation positions of a light source part and light receiving part are important, and it is necessary to monitor the amount of light received of each optical axis in order to confirm whether the light source part and the light receiving part are optimally installed. This amount of light received corresponds to the above-described state information and corresponds to information necessary for a worker or the like to check a device state. JP 2009-515265 A proposes a method for visually recognizing and checking a set parameter or the amount of light by an operator control unit such as a PC that sets a parameter of a safety sensor.

The safety controller is a device that performs safety control, and an interface with the safety input device is generally limited to a safety ON/OFF signal. Further, a PC that is an external device is connected to the safety sensor to check settings of and information on various parameters, and another PC or the like is required for making the setting and check. As described above, when the check is made with the PC connected, a program may be unintentionally rewritten, and the situation may not be immediately confirmed on site. However, there is a demand for a mechanism that allows, in a more simplified manner, an on-site check on various pieces of information on the safety input device. For example, in a case where the industrial machine has been brought into emergency stop, it is desirable to quickly identify the cause, eliminate the danger, and reset the industrial machine as soon as possible.

SUMMARY OF THE INVENTION

It is therefore an object of the present invention to provide a mechanism for causing a safety controller to suitably display various pieces of information from a safety input device.

Means for Solving the Problem

Provided according to an aspect of the present invention is, for example, a safety controller that executes a safety program, the safety controller including a connection unit that connects at least one safety input device, an acquisition unit that acquires a safety input signal from the at least one safety input device connected via the connection unit and state information on the safety input device, an execution engine that generates, in accordance with the safety program, a safety output signal based on the safety input signal acquired by the acquisition unit, and a display unit that displays, based on the state information acquired by the acquisition unit, a state of the safety input device from which the state information is acquired.

The Invention's Effect

According to the aspect of the present invention, various pieces of information from the safety input device can be suitably displayed by the safety controller.

DETAILED DESCRIPTION OF PREFERRED EMBODIMENTS

Figure 1:
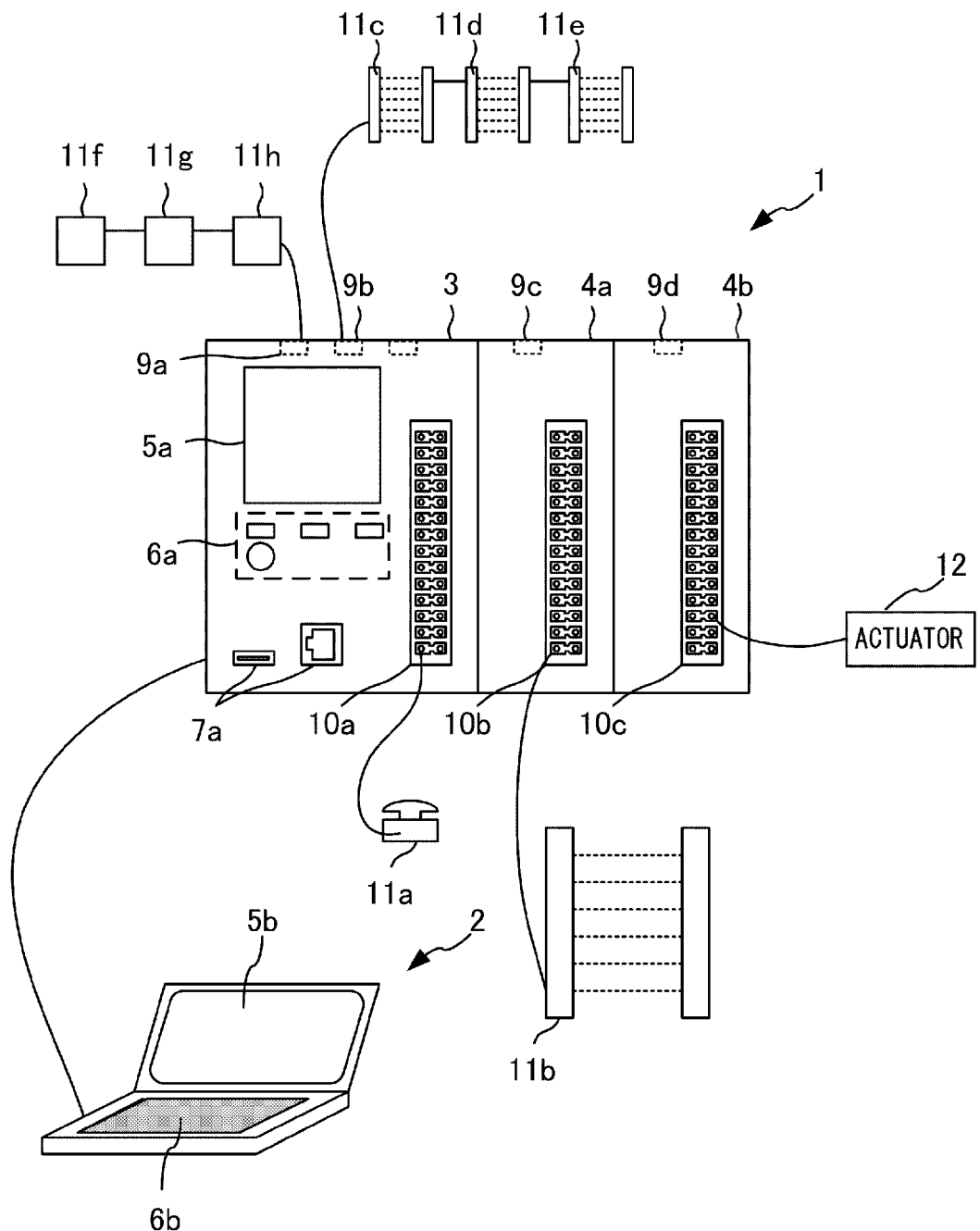
FIG. 1 is diagram for describing a safety controller system.

An embodiment will be described below in detail with reference to the accompanying drawings. Note that the following embodiment is not intended to restrict the invention according to the claims, and all combinations of the features described in the embodiment are not essential to the invention. At least two of the plurality of features described in the embodiment may be selectively combined. Further, the same or similar components are denoted by the same reference numerals, and no repetition of the same description is made. In particular, lowercase alphabets are given to make a distinction between a plurality of components of the same type, and when a description common to a plurality of components is given, the lowercase alphabets may be omitted.

<Safety Controller System>

FIG. 1 shows the whole of a system. In this example, a safety controller system 1 includes a safety controller 3 that serves as a main module and extension modules 4a, 4b. The safety controller 3 executes a safety program transferred from a PC 2 that serves as a creation assistance device that assists a user in creating the safety program. The safety controller 3 includes a display device 5a, a control panel 6a, a communication connector 7a, an IO connector 10a, compatible ports 9a, 9b, and the like. The PC 2 similarly includes a display device 5b and a control panel 6b. The communication connector 7a may be a USB connector or a wired LAN connector. A communication cable from the PC2 is connected to the communication connector 7a. The wired LAN may be industrial Ethernet (registered trademark). LAN is an abbreviation for local area network. A safety input device 11a such as an emergency stop switch or a light curtain is connected to an input terminal of the IO connector 10a. An industrial device such as a robot arm is connected, as an actuator (hazard source), to an output terminal of the IO connector 10a.

Safety input devices 11c to 11h and the like each having an interface adaptable to the compatible ports 9a, 9b are connected to the compatible ports 9a, 9b. Examples of the safety input device 11 connectable to the compatible ports 9a, 9b include a safety sensor such as a light curtain, a safety laser scanner, or a door switch. The compatible port 9 is a port including an ON/OFF input terminal that receives, as a safety input signal, a safety output signal such as an OSSD signal output from the safety input device, power supply terminals such as a +24 V terminal and a 0 V terminal for supplying power to the safety input device, and a communication terminal for communicating with the safety input device. The ON/OFF input terminal is a pair of terminals that receive, as a dual-redundant safety input signal, a dual-redundant safety output signal from the safety input device in the same manner as a pair of input terminals that are included in the IO connector 10a and made dual-redundant. The compatible port 9 may include an AUX terminal or the like instead of or in addition to the communication terminal. The AUX terminal is a terminal for receiving an auxiliary signal from the safety input device 11, such as a signal showing a detection state of the safety sensor or a signal showing a detection state in a warning area different from a protection area, the signal corresponding to the OSSD signal.

The safety controller 3 performs, in accordance with the safety program, an arithmetic operation on an input value such as the safety input signal input from the safety input device 11a to obtain an output value, and outputs the output value to an actuator 12. For example, when the emergency stop switch that is a type of safety input device 11a is pressed down, the safety controller 3 changes the output value from ON (safe) to OFF (not safe). This brings the actuator 12 to a stop. In some case, the IO connector 10a provided in the safety controller 3 cannot accept connections from all safety input devices and actuators. In order to deal with such a case, the extension modules 4a, 4b are connected to the safety controller 3.

The extension modules 4a, 4b include IO connectors 10b, 10c, respectively, and are capable of accepting connections from a safety input device 11b, the actuator 12, and the like. The extension modules 4a, 4b and the safety controller 3 communicate with each other to transfer an input signal, an output signal, and state information from the safety input device. That is, the safety controller 3 generates the output signal by applying the safety program to the input signals acquired from the safety input device 11a connected to the safety controller 3 and from the safety input device 11b connected to the extension modules 4a, 4b. Furthermore, the safety controller 3 outputs the output signal generated in accordance with the safety program to the actuator 12 connected to the safety controller 3 or to the actuator 12 connected to the extension modules 4a, 4b. The extension modules 4a, 4b may also include the compatible ports 9. The safety input device or safety output device is also connectable to the compatible ports 9 of the extension modules 4a, 4b.

The safety controller 3 has a front surface on which the IO connector 10a is provided, a rear surface attached to a fixture, and side surfaces on which other modules are placed. The compatible port 9 may be provided on the front surface of the safety controller 3 from the viewpoint of accessibility. Further, the display device 5a, the control panel 6a, the communication connector 7a, the IO connector 10a, and the like may be provided on the front surface of the safety controller 3, and, with consideration given to the size of the safety controller 3, the compatible port 9 may be provided on an upper surface or a lower surface of the safety controller 3. The safety controller 3 may further include a remote IO port for communicating with a remote IO. The remote IO port is provided, for example, on the upper surface or lower surface of the safety controller 3, which is different from the surface on which the compatible port 9 is provided.

The safety controller 3 and the extension module 4 are connected via an internal bus, and the safety controller 3 communicates with the extension module 4 over the internal bus to acquire the safety input signal from the safety input device 11 connected to the IO connectors 10b, 10c. Further, the safety controller 3 supplies power to the safety input device 11 via the compatible port 9 while acquiring the safety input signal from the safety input device 11 and extra information from the safety input device 11. That is, the safety controller 3 includes a first acquisition path through which the safety controller 3 acquires the safety input signal (input value) from the safety input device 11b connected to the IO connector 10b of the extension module 4 via the internal bus, and a second acquisition path through which the safety controller 3 acquires the safety input signal (input value) from the safety input devices 11c to 11h via the compatible port 9. Note that when the remote IO port is provided, the safety controller 3 includes a third acquisition path via the remote IO port. Further, the safety controller 3 serves as a safety controller and a sensor controller. Generating the safety output signal (output value) in accordance with the safety program using the safety input signal (input value) acquired through the first and second acquisition paths corresponds to the function of the safety controller, and displaying and recording of the extra information from the safety input devices 11c to 11h such as safety sensors or controlling the safety input devices 11c to 11h such as safety sensors corresponds to the function of the sensor controller.

As shown in FIG. 1, the safety input devices 11c to 11e and 11f to 11h such as safety sensors are connectable in series. Such series connection allows power to be supplied from the safety controller 3 to each safety input device 11, and allows a pair of safety output signals to be input to the safety controller 3 as a pair of safety input signals through a logical operation, performed by the safety input devices 11c, 11h located adjacent to the safety controller 3, on the safety output signal from each safety input device 11 to merge the safety output signals. Further, each of the safety input devices 11 connected in series communicates the extra information the safety input device 11 has to the safety controller 3. The safety sensor generally determines whether to output ON or OFF as the safety output signal based on a detection result in the protection area to be monitored, a predetermined determination condition, and an error detection result. The extra information includes, for example, the detection result in the protection area from the safety sensor, the error detection result, and the like, and assists in determining a cause of the safety output signal being an OFF signal.

<Hardware of Safety Controller and Extension Module>

Figure 2:
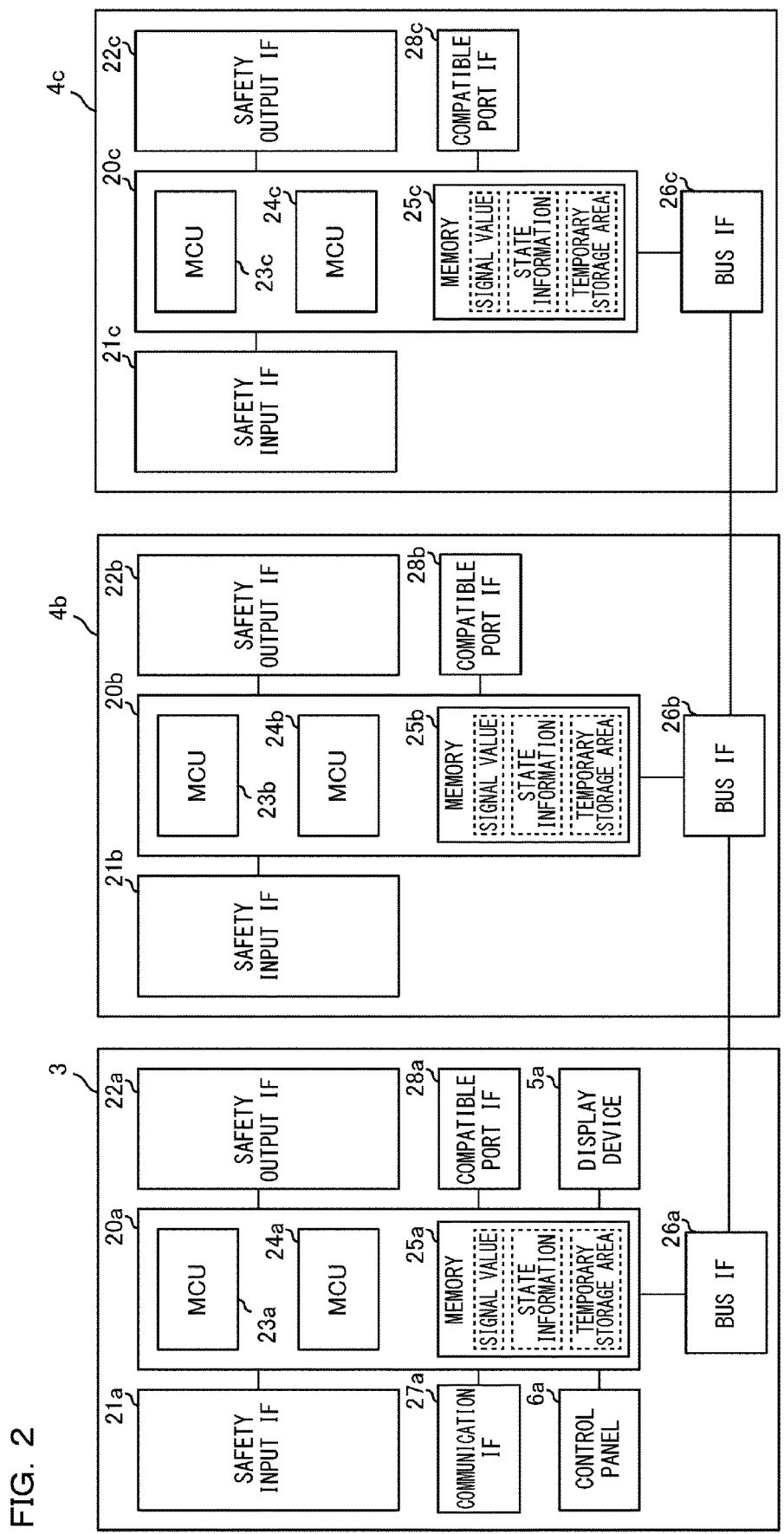
FIG. 2 is a diagram for describing a safety controller and an extension module.

As shown in FIG. 2, a controller 20a of the safety controller 3 includes two micro controller units (MCUs) 23a, 24a and a memory 25a. The controller 20a stores the safety program received from the PC 2 into the memory 25a. Two micro controller units (MCUs) are provided to increase reliability. The MCUs 23a, 24a each execute the safety program stored in the memory 25a. The MCUs 23a, 24a generate an output signal based on an input signal input from the safety input device 11 via the compatible port 9 and a safety input IF 21a and an input signal input from the extension module 4 via a bus IF 26a, and output the output signal to a safety output IF 22a and the extension module 4. For example, when both of the MCUs 23a, 24a output an ON signal, the safety output IF 22a outputs an ON signal. When either or both of the MCUs 23a, 24a output an OFF signal, the safety output IF 22a outputs an OFF signal. As described above, the controller 20a communicates with the extension module 4 via the bus IF 26a to receive the input signal and send the output signal. A communication IF 27a communicates with another device (for example, a PC 2) via the communication connector 7a. A circuit for the OSSD signal, power supply, and communication of the compatible port 9 may be included in a compatible port IF 28a, or may be implemented as a separate circuit.

Examples of the safety input device include a safety laser scanner, a light curtain, and a door switch. The safety input device generally meets a safety standard, and the output of the safety input device is made dual-redundant. When a signal mismatch occurs due to dual-redundancy, the safety controller or sensor itself can detect the failure of its sensor.

The memory 25a further stores, in addition to the safety program received from the PC 2, a signal value of an input signal and state information input from the safety input devices 11a, 11b via the safety input IF 21a as history information. Note that the MCUs 23a, 24a temporarily store information acquired from each safety input device into a temporary storage area provided in the memory 25a, and store the information as genuine history information into the memory 25a when a predetermined condition is satisfied. On the other hand, the MCUs 23a, 24a delete the information when a predetermined time elapses from the temporary storage without satisfying the predetermined condition. This makes it possible to prevent memory resources from being depleted due to the information from the safety input device. The predetermined condition corresponds to, for example, a change in logic level of the safety output signal, and the MCUs 23a, 24a store, as the history information, information before and after the change point into the memory 25a. This allows a worker to check, for example, the state information on the safety input device before and after an emergency stop of the actuator 12, and the like, and makes useful information available in an efficient manner.

A controller 20b of the extension module 4a includes two MCUs 23b, 24b and a memory 25b. Two micro controller units (MCUs) are provided to increase reliability. The MCUs 23b, 24b each execute a control program stored in the memory 25b. Upon receipt of an input signal from the safety input device 11 via a safety input IF 21b, the controller 20b sends the input signal to the safety controller 3 via a bus IF 26b. Upon receipt of an output signal from the safety controller 3 via the bus IF 26b, the controller 20b outputs the output signal to the actuator 12 or the like via a safety output IF 22b. The memory 25b further stores information on the safety input device connected to the extension module 4 in the same manner as the memory 25a. The storage method is the same as that of the safety controller 3 described above. Note that, when the memory 25b of the extension module 4 is smaller in memory size than the memory 25a of the safety controller 3, with only the temporary storage area provided, the information before and after the change point described above may be sent to the safety controller 3. In this case, the safety controller 3 also stores the history information on the safety input device connected to the extension module 4. Alternatively, the safety controller 3 may also send the history information to an external device to hold the history information in the external device. Alternatively, each device may store the history information to the extent possible and may cause, when running out of memory, another device to store the history information. A compatible port IF 28b may be provided as a circuit for the compatible port 9.

A controller 20c of the extension module 4b includes two MCUs 23c, 24c and a memory 25c. Two micro controller units (MCUs) are provided to increase reliability. The MCUs 23c, 24c each execute a control program stored in the memory 25c. Upon receipt of an input signal from the safety input device 11 via a safety input IF 21c, the controller 20c sends the input signal to the safety controller 3 via a bus IF 26c. Upon receipt of an output signal from the safety controller 3 via the bus IF 26c, the controller 20c outputs the output signal to the actuator 12 or the like via a safety output IF 22c. A compatible port IF 28c may be provided as a circuit for the compatible port 9.

<Hardware of PC>

Figure 3:
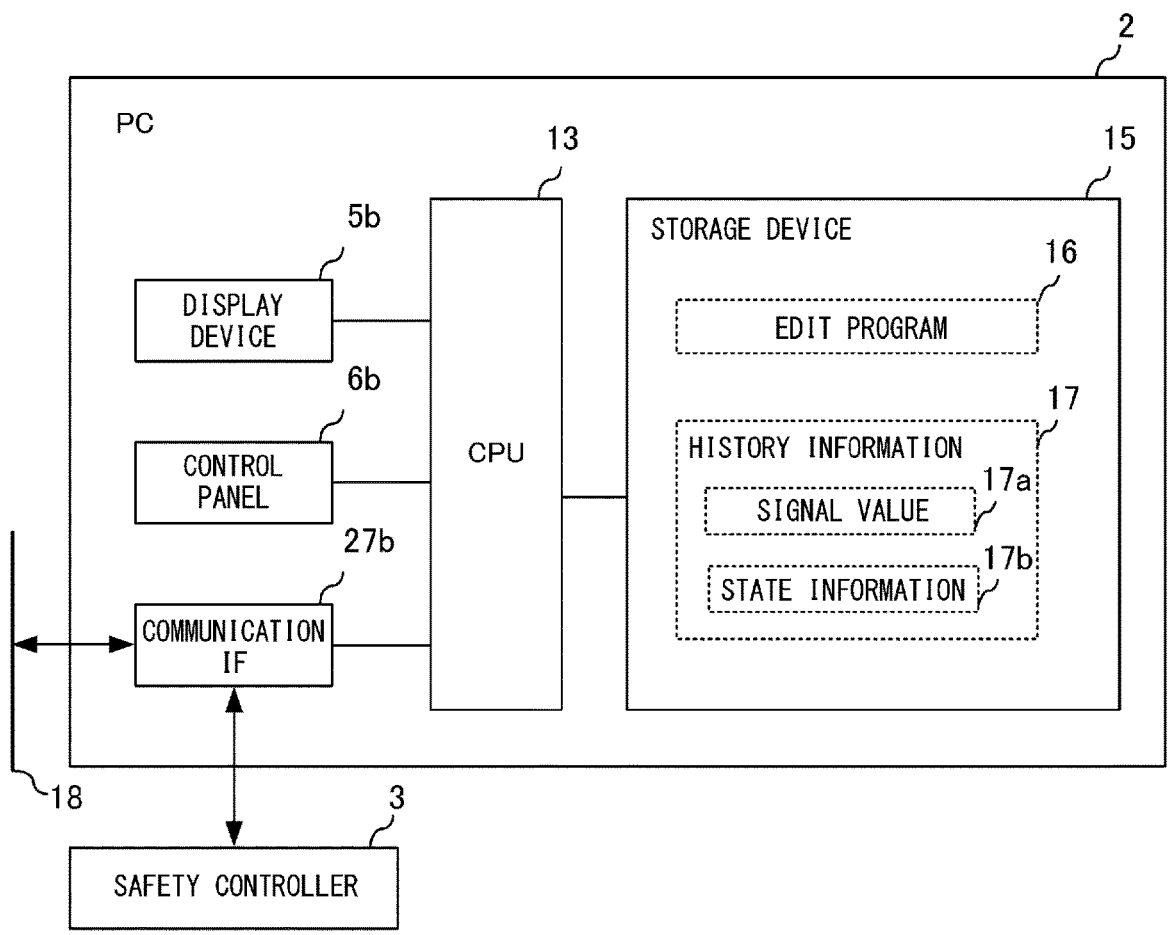
FIG. 3 is a diagram for describing a web server.

As shown in FIG. 3, the PC 2 includes a CPU 13, the display device 5b, the control panel 6b, a storage device 15, and a communication IF 27b. The display device 5b, the control panel 6b, the storage device 15, and the communication IF 27b are each electrically connected to the CPU 13. Examples of the storage device 15 include a RAM, a ROM, an HDD, and an SSD, and may further include a removable memory card. CPU is an abbreviation for central processing unit. ROM is an abbreviation for read-only memory. RAM is an abbreviation for random access memory. HDD is an abbreviation for hard disk drive. SSD is an abbreviation for solid state drive.

The storage device 15 stores an edit program 16 and history information 17. These pieces of information are allowed to be updated later. The user of the PC 2 causes the CPU 13 to execute the edit program 16 stored in the storage device 15 to edit the safety program, configuration information, or the like through the control panel 6b and to transfer the safety program, the configuration information, or the like to the safety controller 3. The configuration information includes identification information on the extension module 4 connected to the safety controller 3, and identification information (terminal assignment information) on the safety input device 11 and the actuator 12 each connected to a corresponding one of the input terminals and output terminals provided in the compatible ports 9a, 9b and the IO connectors 10a to 10c. The history information 17 is the same as the information from the safety input device stored in the memories 25a, 25b described above and is acquired from the safety controller 3. The CPU 13 may present, to the user, history information showing the state of each safety input device and the like based on the history information 17.

The PC 2 can also serve as a web client for the safety controller 3. In this case, the PC 2 acquires screen information generated by the safety controller 3 through the web over a communication line 18 of an external network and displays the screen information on the display device 5b. Such screen information includes contents equivalent to history information, to be described later, displayed by the safety controller 3. That is, the safety controller 3 serves as a web server and is capable of providing a screen showing a status of a sensor or the like based on various pieces of information acquired from the safety input device to an external device such as the PC 2 serving as a web client. This makes it possible to remotely check the status of the safety controller system 1.

<Detailed UI of Safety Controller>

Figure 4:
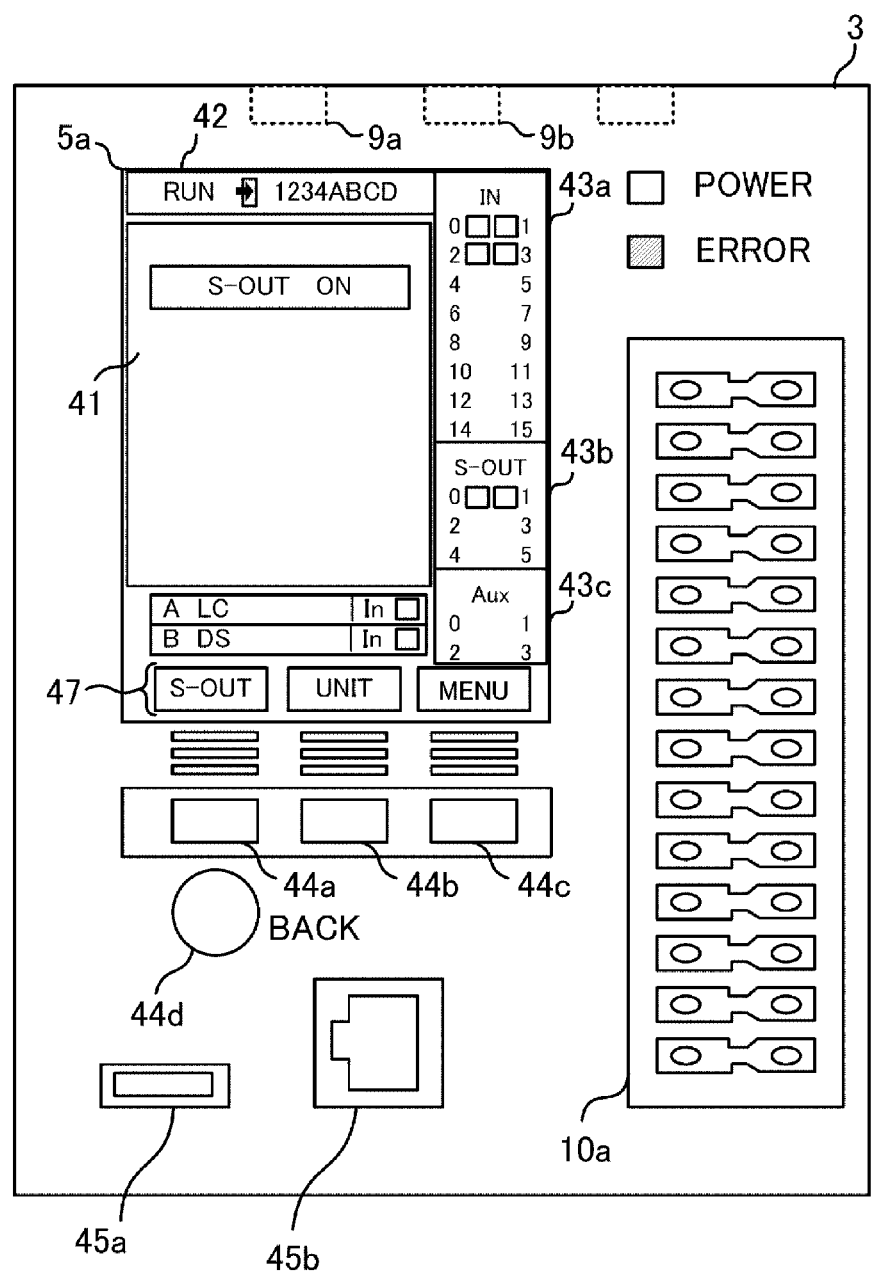
FIG. 4 is a diagram for describing a detailed UI of the safety controller.

FIG. 4 shows a detailed user interface (UI) of the safety controller 3. Note that the same components as the components already shown in FIG. 1 are denoted by the same reference numerals, and no description will be given of such components. The safety controller 3 includes, as a user interface, the display device 5a and the control panel 6a in a part of a housing of the safety controller 3 (for example, on a front surface of the housing). The control panel 6a is provided with keys 44a to 44d. A liquid-crystal display (LCD) with a touchscreen may be used as the display device 5a, and, in this case, a control panel is provided integrally with the display device 5a. A reference numeral 45a denotes a USB connector, and a reference numeral 45b denotes a LAN connector. Further, although various screens, to be described below, displayed on the display device 5a are displayed under the control of the MCU 23a or 24a, the control may be performed by any one of the dual-redundant MCUs. Herein, a description will be given, as an example, of a case where the MCU 23a performs the control. A program for implementing the control is a program different from the safety program, and may be a program embedded in the MCU in advance or a program stored in the memory 25a. Note that, as described with reference to FIG. 1, the safety controller 3 includes, for example, the plurality of compatible ports 9a, 9b provided on an upper part of the housing of the safety controller 3.

On the display device 5a shown in FIG. 4, a top screen serving as a basic component screen is displayed. The top screen is a screen that is displayed under a normal condition while the safety controller system 1 is in operation. Various display areas 41 to 43c and 47 are provided on the top screen. The MCU 23a controls a display in each of the display areas 41 to 47 in accordance with a system status. In the display area 41, a safety output state is displayed. In the display area 42, an execution state of the safety program, a login state, a set value, and the like are displayed. In the display areas 43a to 43c, signal states (ON, OFF) of a safety input and safety output connected to ports of the safety controller 3 are displayed. In the display area 47, functions to be performed when the keys 44a to 44c are operated are displayed. Note that these displays are merely examples and are not intended to limit the present invention. The example in FIG. 4 shows that when the key 44a is operated, a transition to a safety output detailed screen is made. When the key 44b is operated, a transition to a detailed screen of each unit connected to the safety controller 3 is made. When the key 44c is operated, a transition to a menu screen is made. The key 44d is a BACK key, and the MCU 23a makes, upon receipt of operation of the key 44d, a transition back to a screen previously displayed.

Note that the top screen shows signal values (ON, OFF) of devices connected to the safety controller 3. However, each device has state information in addition to the signal value. For example, a light curtain serving as the safety input device has information on the amount of light received, and a door switch has a key lock state, a door open or closed state, and the like. These pieces of information may be useful for determining a cause when a system emergency stop occurs. Therefore, the safety controller 3 according to the present embodiment also displays such pieces of information. As for such a display, a device state may be output on a real-time basis, or a past device state may be output. The state output to be displayed on a display part of the safety controller 3 will be described below. Note that, as will be described later, the display to be described below may be sent to the safety input device that has acquired information and displayed, or the safety controller 3 may serve as a web server and provide, to a web client such as the PC 2, generated screen information.

<State Output of Safety Input Device>

(Light Curtain State Output Screen)

Figure 5A:
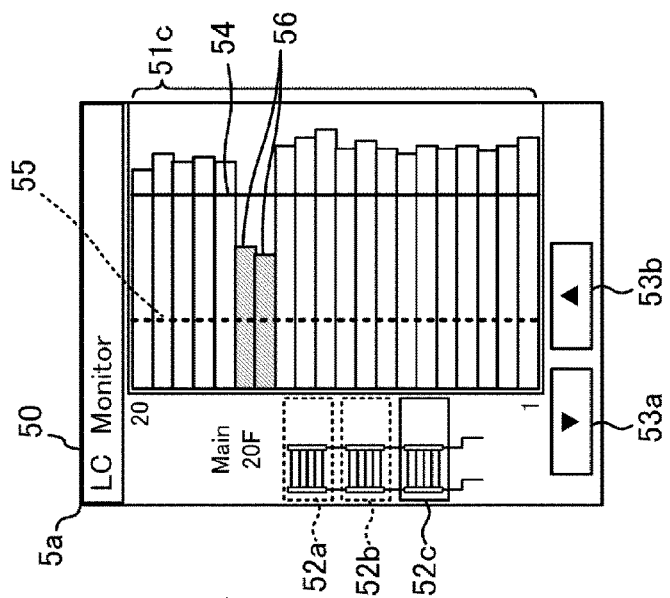
FIGS. 5A-C are diagrams for describing a user interface.
Figure 5B:
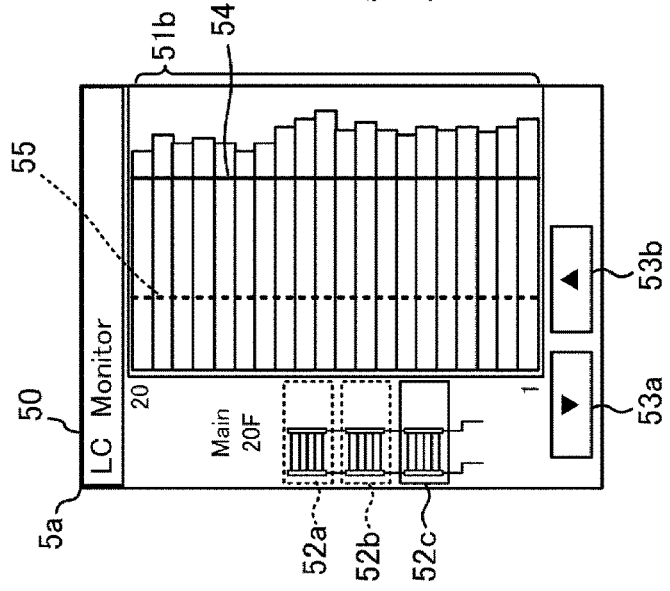
Figure 5C:
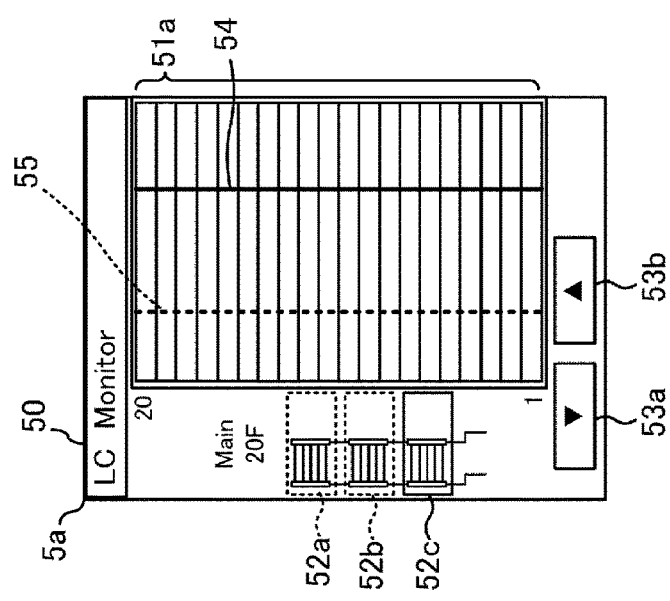

FIGS. 5A to 5C show a state output screen 50 of a light curtain serving as the safety input device.

The light curtain is a safety sensor that monitors the protection area with a plurality of optical axes, the light curtain including a plurality of pairs of light emitting elements and light receiving elements corresponding to the plurality of optical axes, the light emitting element and the light receiving element making up each pair being arranged facing each other, detects an object in the protection area by detecting the blocking of light of the optical axes, detects an error in its own circuit, and generates the safety output signal based on a result of the detection of the object and a result of the detection of the error.

The extra information on the light curtain includes, for example, at least one of detection information on an object in the protection area, information showing ON/OFF of each optical axis of the light curtain, information showing an amount of light of each optical axis of the light curtain, information showing an error detected in the light curtain, information showing a mute state of the light curtain, or information showing that the light curtain is waiting to be reset.

The safety controller 3 can acquire not only information on its own safety control but also information on the generation of the safety output signal from the safety input device 11 and information on the protection area as the extra information.

On the top screen shown in FIG. 4, for example, the key 44b is operated to make a transition to an item screen of each unit, and when a specific unit, a light curtain connected to a port A herein, is selected, the MCU 23a displays the state output screen 50 on the display device 5a. The MCU 23a generates the state output screen 50 in accordance with the safety input signal acquired from the safety input device 11*b* and the amount of light received that is the state information. FIGS. 5A to 5C each show changes in the amount of light received of a plurality of optical axes of a light sensor.

The state output screen 50 is made up of at least displays 51*a* to 51*c* and 52*a* to 52*c*. On the displays 52*a* to 52*c*, an icon indicating a corresponding one of a plurality of light curtains connected to the safety controller 3 is displayed. In the example shown in FIGS. 5A to 5C, a light curtain associated with the display 52C has been selected, and a state of the light curtain is displayed and output on the displays 51*a* to 51*c*. Operating the keys 44*a*, 44*b* corresponding to the displays 53*a*, 53*b* allows the icon indicating another light curtain to be selected, and the MCU 23*a* displays corresponding state output on the displays 51*a* to 51*c*.

On the displays 51*a* to 51*c*, the amount of light received of each optical axis of the selected light curtain is displayed in a gauge (bar graph) form. A reference numeral 54 denotes a threshold for issuing a warning, and a reference numeral 55 denotes a threshold for turning the safety output to OFF. The MCU 23*a* displays a warning on the display device 5*a* when the amount of light received of any optical axis falls below the threshold 54, and turns the safety output to OFF when the amount of light received of any optical axis falls below the threshold 55. A gauge displayed corresponding to each optical axis can be displayed with the maximum amount of light received represented as 100% and a state with no received light represented as 0%. The display 51*a* in FIG. 5A shows that the amounts of light received of all the optical axes are 100%, the light curtain is in normal operation, and light has not been blocked by an entry of a person or the like. The display 51*b* in FIG. 5B shows that the amount of light received of each optical axis is lower than the amounts of light received shown in FIG. 5A. However, even in the state shown in FIG. 5B, the safety controller system 1 can secure the safety, and there is no particular problem. The display 51*c* in FIG. 5C shows that two of the gauges are lower than the threshold 54, as denoted by a reference numeral 56. Being lower than the threshold 54, a corresponding gauge is highlighted to warn the workers or the like. Further, the MCU 23*a* may provide notification to the user with a pop-up screen, a warning sound, or the like. In this case, the MCU 23*a* serves as a notification unit.

In the examples shown in FIGS. 5A to 5C described above, the MCU 23*a* outputs the state of the light curtain based on the information acquired from the light curtain in real time. However, the present invention is not limited to this configuration, and the MCU 23*a* can also display the state output screen based on the history information on the light curtain stored in the memory 25*a*. In this case, the MCU 23*a* can acquire the history information from the memory 25*a* and output the state of the light curtain before and after the safety output is turned to OFF. Further, it is possible to go forward or backward in time of the history information in accordance with a user operation. Details of the history information will be described later.

(Door Switch State Output Screen)

Figure 6:
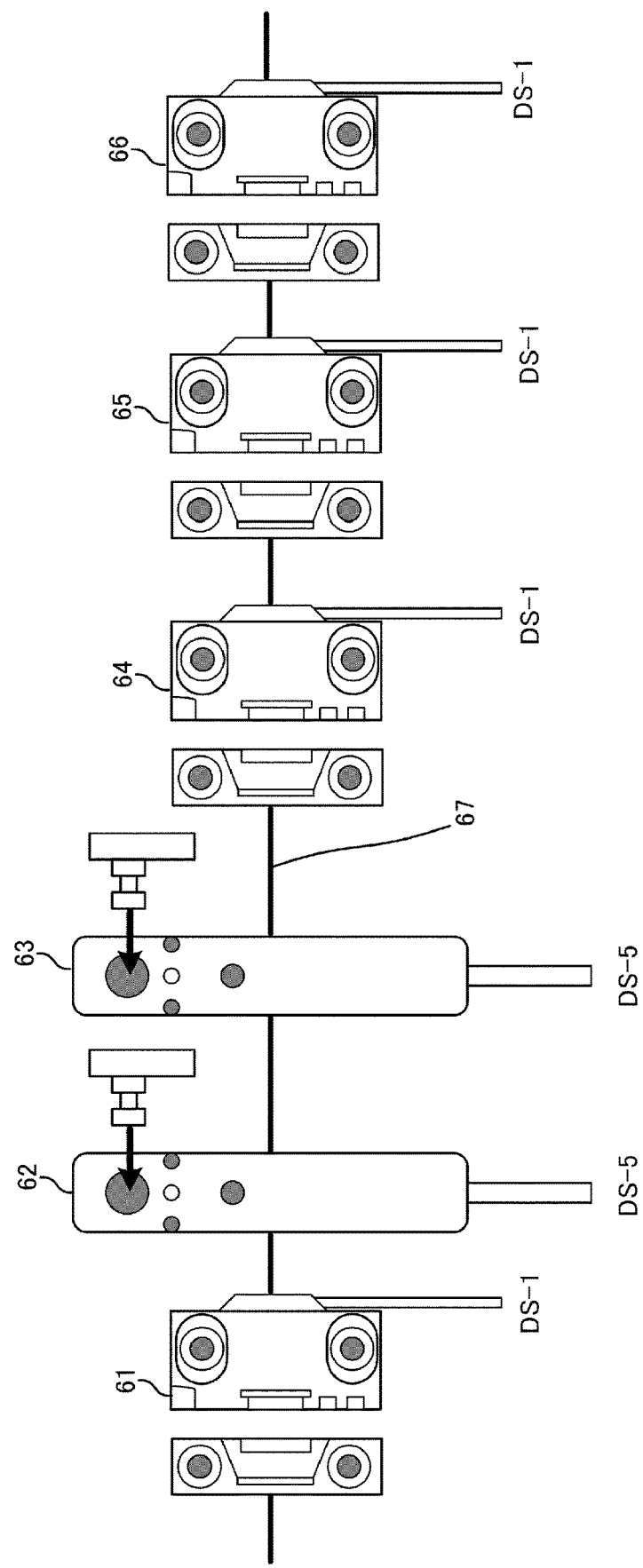
FIG. 6 is a diagram for describing cascade-connected door switches.

FIG. 6 shows a state where a plurality of door switches (DS) each serving as the safety input device are cascade-connected.

The door switch is a safety sensor that includes an actuator having a transponder and a detector that detects a distance to the transponder, the actuator and the detector being installed at positions that move relative to each other as the door opens and closes, detects, by the detector, an open or closed state of the door based on the distance to the transponder, detects an error in its own circuit or the like, and generates the safety output signal based on a result of the detection of the opening or closing of the door and a result of the detection of the error. Further, the door switch may include a lock mechanism that prevents the door from being opened, and the door switch controls a lock state and an unlock state by electrically controlling a lock pin of the lock mechanism.

The extra information on the door switch includes at least one of information on detection of the opening or closing of the door, information showing lock control of the door switch, information showing an error that has occurred in the door switch, information showing a mute state of the door switch, and information showing that the door switch is waiting to locked.

The safety controller 3 can acquire not only the information on its own safety control but also information on the generation of the safety output signal from the safety input device 11 and information on the opening or closing of the door as the extra information.

As shown in FIG. 6, suppose that these cascade-connected door switches 61 to 66 are connected to a port B of the compatible port 9 of the safety controller. The door switches 61, 64 to 66 are noncontact-type door switches that detect opening or closing of the door with a main body and an actuator out of contact with each other, and the door switches 62, 63 are lock-type door switches in which two members mechanically fit each other. Such a plurality of types of door switches are cascade-connected by a signal line 67, and then connected to the compatible port (herein, the port B) of the safety controller 3. Therefore, the MCU 23*a* can acquire signal values of and state information on the plurality of door switches via the port B.

Figure 7A:
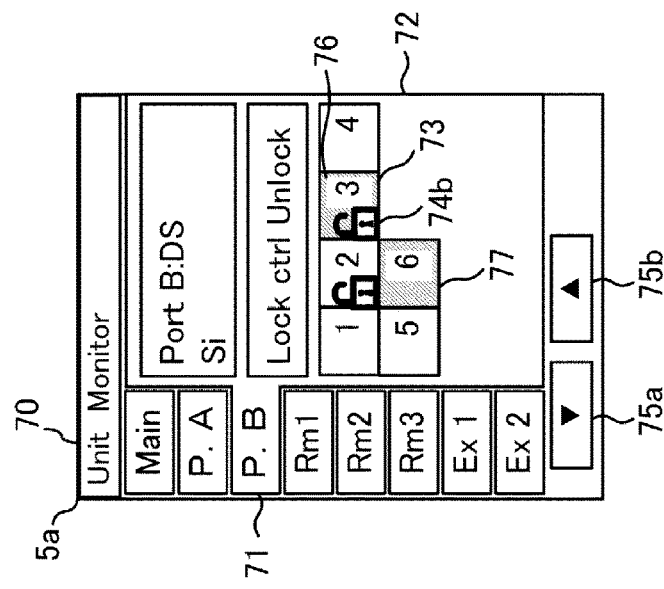
FIGS. 7A-C are diagrams for describing a user interface.
Figure 7B:
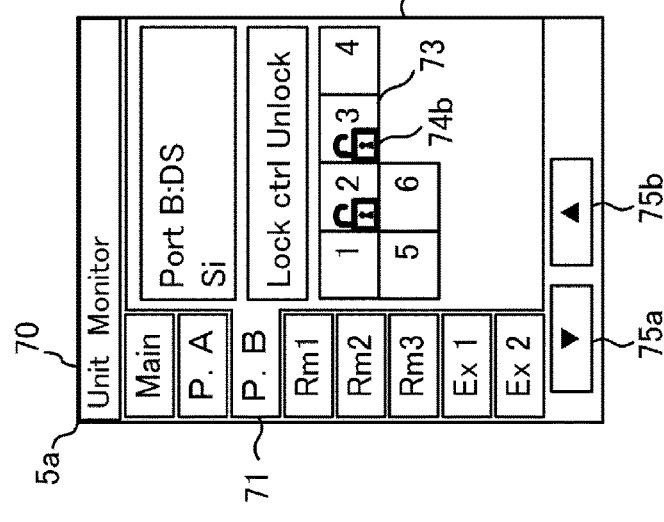
Figure 7C:
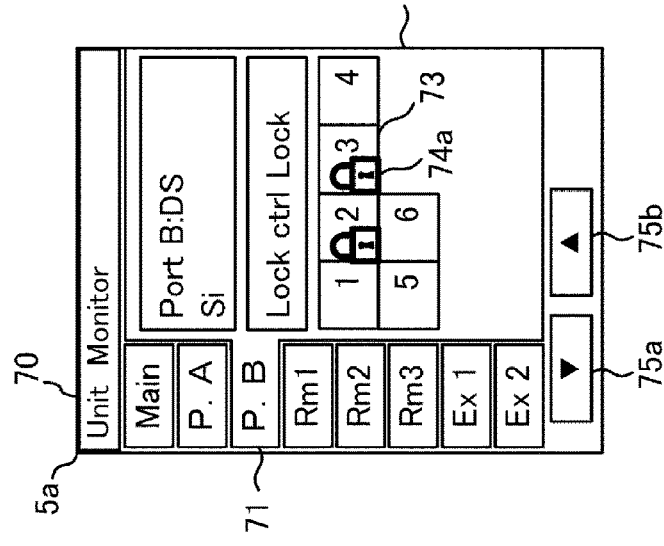

FIGS. 7A to 7C show a state output screen 70 of the cascaded-connected door switches shown in FIG. 6. On the top screen shown in FIG. 4, for example, the key 44*b* is operated to make a transition to the item screen of each unit, and when a specific unit, a door switch connected to the port B herein, is selected, the MCU 23*a* displays the state output screen 70 on the display device 5*a*. The MCU 23*a* generates the state output screen 70 in accordance with the safety input signal acquired from the safety input device 11*b*, and an open or closed state or lock state that is the state information. FIGS. 7A to 7C each show changes in the lock state and open or closed state of doors monitored by the plurality of door switches.

The state output screen 70 is made up of at least displays 71 to 75*b*. The display 71 shows an item when the key 44*b* is operated to make a transition to the item screen of each unit, and FIGS. 7A to 7C show a state where an item associated with the port B has been selected. Operating the keys 44*a*, 44*b* corresponding to the displays 75*a*, 75*b* allows another item to be selected, and the MCU 23*a* displays corresponding state output. For example, when the item of port A is selected, the above-described state output screen 50 of the light curtain is displayed in the present example. Since the plurality of door switches cascade-connected are connected to the port B as described above, the display 72 shows states of all the door switches. The display 73 shows an icon corresponding to each door switch. For example, "1" to "6" displayed in the icons correspond to the door switches 61 to 66, respectively.

The display 74*a* shown in FIG. 7A is an icon showing the lock state of each of the lock-type door switches 62, 63, and shows a locked state. On the other hand, the display 74*b* shown in FIG. 7B is an icon showing an unlocked state.

Further, as denoted by reference numerals 76, 77 in FIG. 7C, an icon "3" and an icon "6" each show that a corresponding door is open. Although such icons are displayed with shading applied herein, any method may be applied as long as the icons are highlighted. For example, the icons may be displayed with shading in a different color from other icons showing the closed state applied, displayed in a blinking manner, or displayed with an icon that calls the user's attention superimposed on each of the icons.

As described above, the safety controller 3 according to the present embodiment can acquire the state information in addition to the safety input signal from the door switch and display the state information on its own display part. Herein, the MCU 23a outputs, based on the information acquired from a door switch in real time, the lock state or open or closed state corresponding to the state of the door switch. However, the present invention is not limited to this configuration, and the MCU 23a can also display the state output screen based on the history information on the door switch stored in the memory 25a. In this case, the MCU 23a can acquire the history information from the memory 25a and output the state of the door switch before and after the safety output is turned to OFF. Further, it is possible to go forward or backward in time of the history information in accordance with a user operation. Details of the history information will be described later.

As described above, the safety controller 3 according to the present embodiment generates and displays a suitable state output screen in accordance with the type of the safety input device. That is, the safety controller 3 determines the type based on the information acquired from the safety input device and generates the display screen in accordance with the type. For example, the safety controller 3 may determine the type based on the identification information on the safety input device. Note that, in the present embodiment, the display examples of the light curtain and the door switch have been described, but it is possible to generate, in the same manner, a display screen in accordance with types of safety sensors such as a safety laser scanner and a safety 3D camera as the safety input devices. Further, regardless of the state output of the safety input device, for example, a description of a display of the safety sensor or information on a setting device such as a mode selector may be displayed.

Herein, a state output screen of a safety scanner such as a safety laser scanner will be briefly described. The safety scanner is a safety sensor that scans a preset protection area with a laser beam to detect an object in the protection area based on light reflected off the object, detects an error in its own circuit or the like, and generates the safety output signal based on a result of the detection of the object and a result of the detection of the error. The extra information on the safety scanner includes at least one of detection information on the object in the protection area, information showing ON/OFF of each optical axis, information showing a length or amount of light of each optical axis of the safety scanner, information showing an error that has occurred in the safety scanner, information showing a mute state of the safety scanner, information showing that the safety scanner is waiting for release of a reset, or image information acquired by a camera provided in the safety scanner. The safety controller 3 can acquire not only information on its own safety control but also information on the generation of the safety output signal from the safety input device 11 and information on the protection area as the extra information.

The safety scanner is made up of various components, and may be made up of, for example, a measurement unit and a camera. The measurement unit houses a rotary optical system that emits detection light in a horizontal direction and scans the detection light across a horizontal scan plane. As the detection light, for example, laser light having a wavelength in the infrared region is used. The detection light is repeatedly scanned at regular scan intervals. When an object is detected by the measurement unit, information on distance to a target can be obtained. The camera is an imaging device that captures an image of the protection area and generates a camera image as a monitoring image, and a plurality of the cameras may be provided. In this case, the cameras are arranged in different orientations. Since the camera is disposed above the scan plane of the measurement unit, it is possible to obtain a camera image representing an overhead view of the scan plane. Therefore, the information from the safety scanner includes an operation state, range information, a camera image, setting data, an event history, and the like. The use of these pieces of information allows the camera image or scan image when an entry of an object is detected to be displayed as the state output screen by the safety scanner. Note that, when the display device 5a of the safety controller 3 is capable of displaying a two-dimensional image, it is possible to display the state output screen as described above. Otherwise, the information may be output to an external device to cause the external device to display a richer state output screen. In this case, the safety controller 3 serves as a web server. Details of the function of the web server will be described later.

(State Display)

Figure 8C:
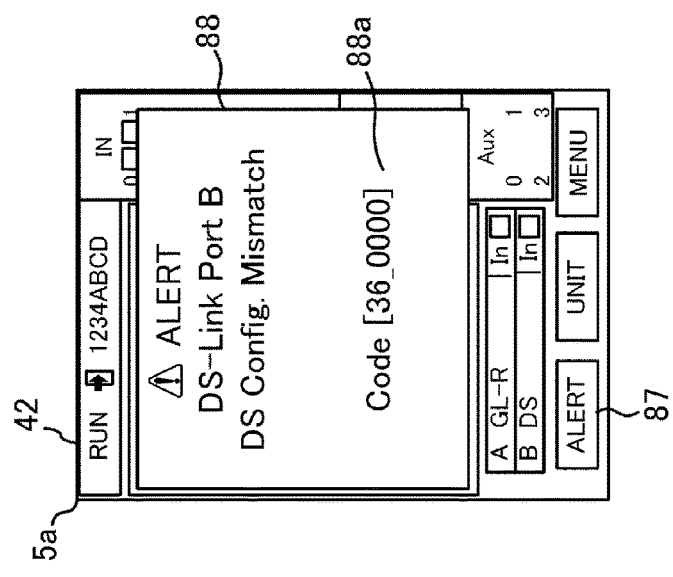
FIGS. 8A-C are diagrams for describing a user interface.
Figure 8B:
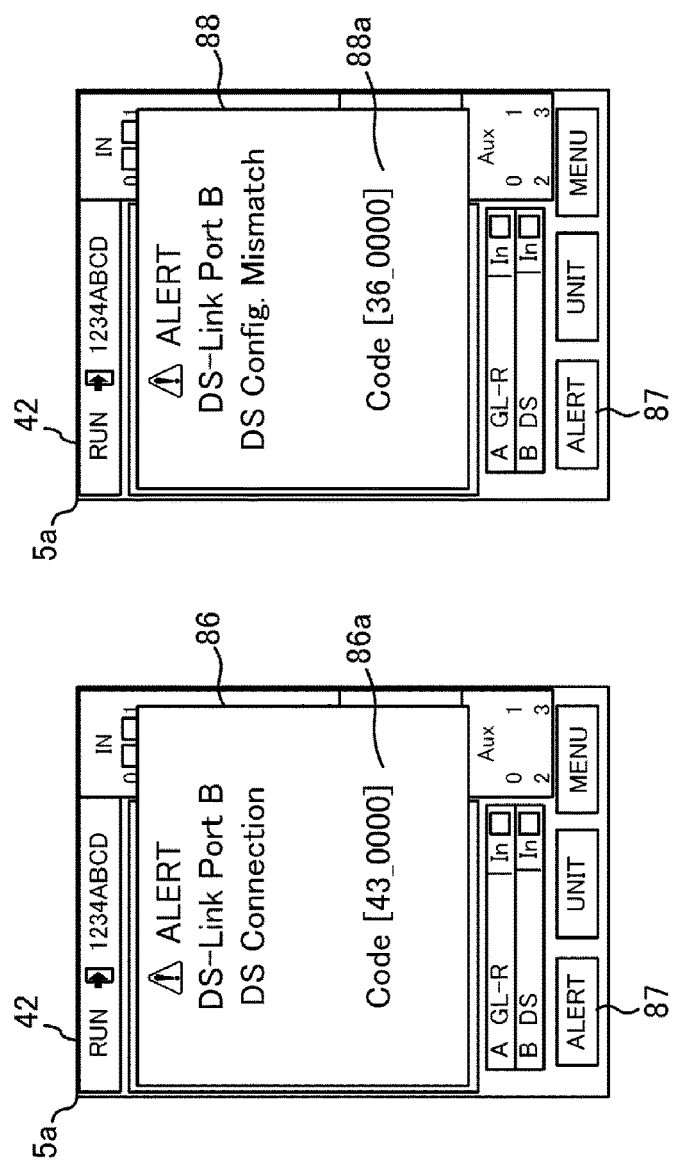
Figure 8A:
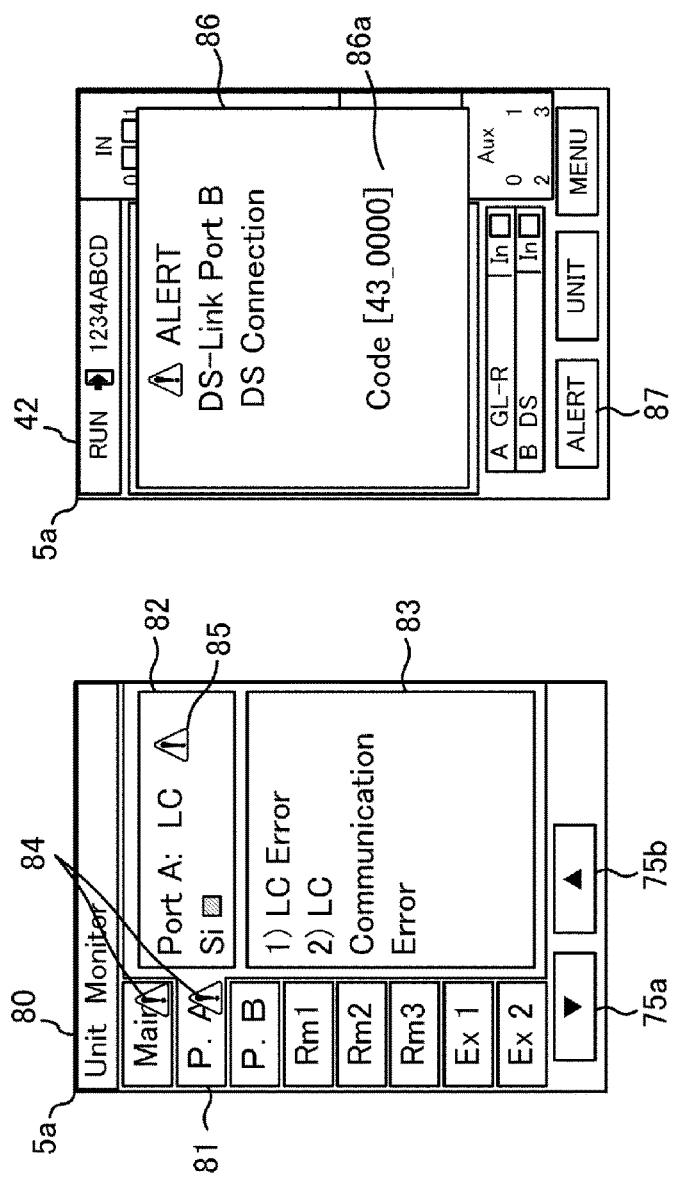

FIGS. 8A to 8C show various error screens displayed on the display device 5a when an error occurs. Although an error display will be described as an example of a state display, a state indicating a normal state may be displayed before an error occurs. When the normal state is shown, the normal state may be shown on the screen display, or may be shown using a lighting state of an LED lamp or the like. FIG. 8A shows an error screen displayed when an error occurs and, for example, the key 44b is operated on the top screen shown in FIG. 4 to make a transition to the item screen of each unit, and a specific unit, a light curtain connected to the port A herein, is selected. Alternatively, the error screen may be displayed when the key 44c corresponding to the menu key is operated on the top screen shown in FIG. 4, and the history information is selected from the menu screen (not shown). A display 81 shows each item and shows that the port A is currently selected. The MCU 23a displays a mark 84 with the mark 84 superimposed on the item where an error has occurred among the plurality of items. Herein, it shows that an error has occurred in the port A, and an error has occurred in the main module accordingly. A display 82 shows a device connected to the port A, and a mark 85 indicating that an error has occurred is also displayed. A display 83 is a display showing details of the error, and shows herein that an error has occurred in one of the plurality of light curtains. Therefore, the user can easily identify a cause of the error by checking a part related to the details of the error, for example, checking whether there is a problem with the communication connection. Further, when the user selects the display 82 or the display 83, the state output screen of the light curtain as described with reference to FIGS. 5A to 5C can be displayed. In this case, the MCU 23a may acquire and display history information before and after the occurrence of the error, instead of displaying real-time information.

FIGS. 8B and 8C show pop-up displays 86, 88, respectively, displayed when an error occurs during the display of the top screen shown in FIG. 4. The display 86 in FIG. 8B shows that a connection error has occurred in a door switch connected to the port B. Further, the display 86*a* shows a detailed error code. This allows the worker to know details of the error. The display 88 in FIG. 8C shows an error when configurations of a plurality of door switches cascade-connected to the port B do not match. The display 88*a* shows a detailed error code. Further, a display 87 in FIGS. 8B and 8C shows that a function of terminating a warning is assigned to the key 44*a*.

(Display of Change Point Based on History Information)

FIGS. 9A to 9C and 10A to 10D show change point display screens showing history information before and after the safety output changes to OFF. Each change point display screen is a screen showing the state of the safety output displayed when, for example, the key 44*a* is operated on the top screen shown in FIG. 4. Alternatively, the change point display screen may be displayed on the display deice 5*a* when the key 44*c* corresponding to the menu key is operated on the top screen shown in FIG. 4, and the history information is selected on the menu screen (not shown). Note that the screen examples shown in FIGS. 9A to 9C and FIGS. 10A to 10D are given for describing that the current state of each safety input signal and the state before and after the change point can be displayed in accordance with a change in the safety output signal. Therefore, those signal values are merely examples, and a combination of signal values that may appear while the safety system is in operation is not exactly reproduced.

Figures 9A, 9B, 9C:
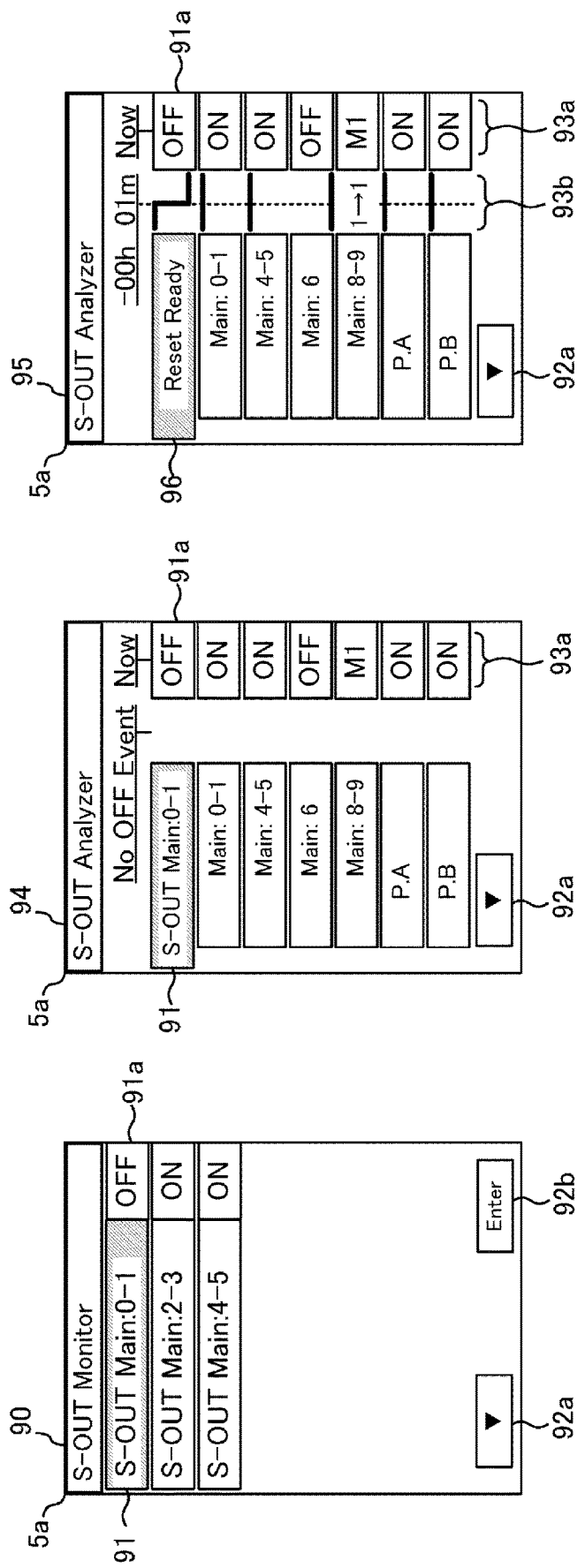
FIGS. 9A-C are diagrams for describing a user interface.

A screen 90 shown in FIG. 9A is a selection screen for selecting a target output to be displayed on the change point display screen. A display 91 shows each safety output in a list form, and a display 91*a* shows a status of a safety output of a corresponding item as ON or OFF. The selection screen 90 shows that a safety output Main: 0-1 is turned to OFF. A display 92*a* shows that an item selected state is moved downward when the corresponding key 44*a* is operated. In the example shown in FIG. 9A, the item Main: 0-1 is in the selected state. A display 92*b* makes, when the corresponding key 44*c* is operated, a transition to a detailed screen of the selected item.

A screen 94 shown in FIG. 9B is a screen to which a transition is made when the key 44*c* is operated in FIG. 9A. The screen 94 shows the current signal state of each port (signal from an associated input block). A display 93*a* shows the current signal state of each port as ON or OFF. It shows that Main: 6 is OFF, and allows a cause of the safety output being turned to OFF to be checked. A screen 95 shown in FIG. 9C is a screen to which a transition is made when any operation is performed during display of the screen 94 shown in FIG. 9B, and shows the state of each safety input when the safety output (Main: 0-1) is turned to OFF. The MCU 23*a* can refer to the history information stored in the memory 25*a* and then display the screen, for example. Note that any operation described above may be an operation on any of the keys 44*a* to 44*c* or an operation on another key (not shown). The screen 95 corresponds to a screen where a display 93*b* from the history information is added to the screen 94. The screen 95 shows timing at which the safety output (Main: 0-1) is turned to OFF, and, as shown in FIG. 9C, shows a state where a signal is turned from ON to OFF. It is possible to go forward or backward in time of the history information through any operation here. A display 96 shows that an output block of the safety output is currently waiting for release of a reset.

Figure 10A:
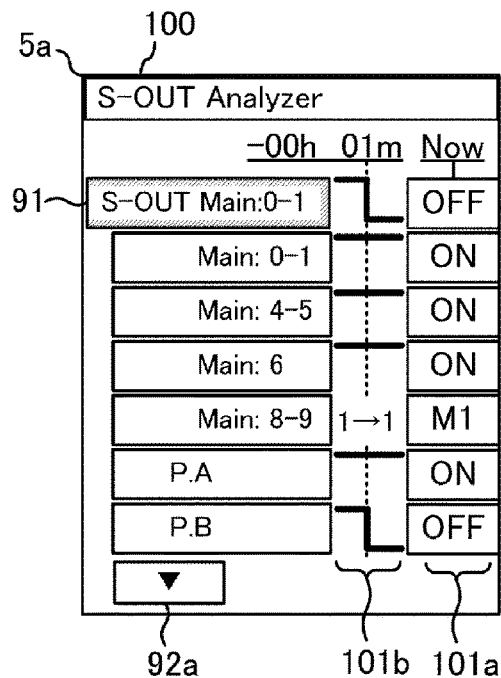
FIGS. 10A-D are diagrams for describing a user interface.
Figure 10B:
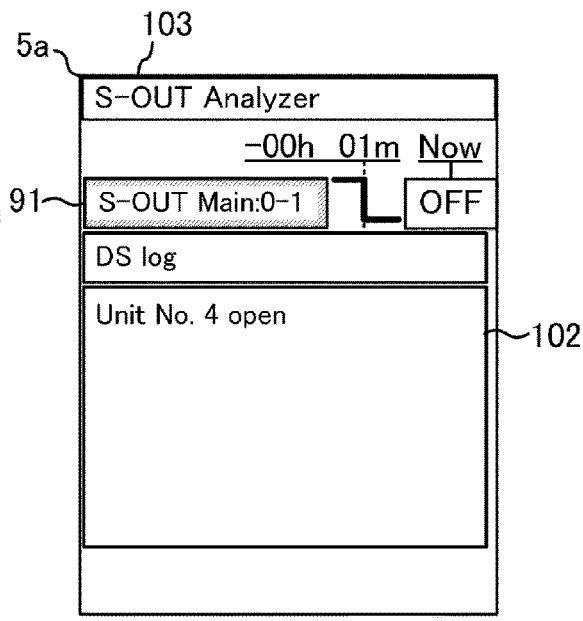
Figure 10C:
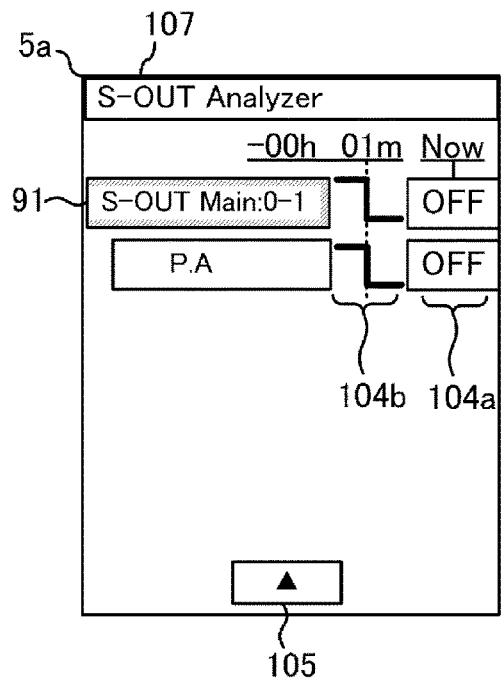

FIGS. 10A and 10C show a change point display screen when the safety output is turned to OFF in response to the OFF signal from the door switch. Note that the same components as the components of the screens shown in FIGS. 9A to 9C are denoted by the same reference numerals, and no description will be given of such components. A screen 100 shown in FIG. 10A is a change point display screen when the safety output is turned to OFF in response to the OFF signal from the door switch connected to the port B. A display 101*a* shows the current signal state of each port as ON or OFF. A display 101*b* shows a change in signal at each port at timing when the safety output is turned to OFF. Furthermore, a screen 103 shown in FIG. 10B is a screen showing a cause of the door switch being turned to OFF. The MCU 23*a* displays that, for example, a door No. 4 is open as shown on a display 102 based on the state information included in the history information stored in the memory 25*a*.

Figure 10D:
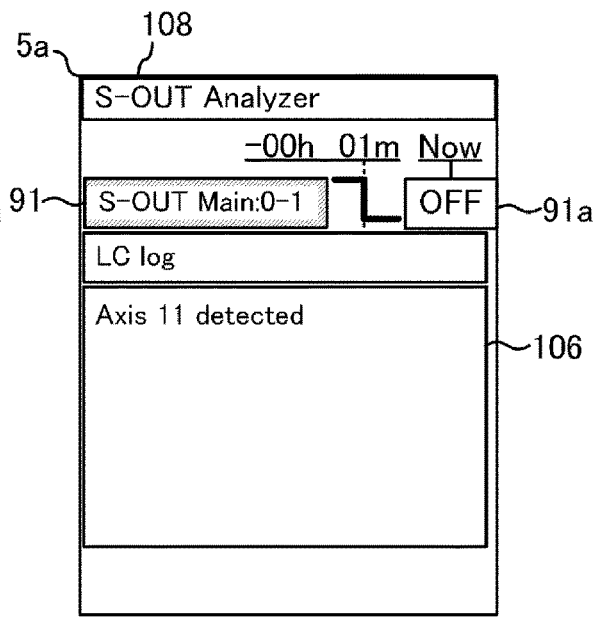

FIGS. 10C and 10D show change point display screens when the safety output is turned to OFF in response to the OFF signal from the light curtain. Note that the same components as the components of the screens shown in FIGS. 9A to 9C are denoted by the same reference numerals, and no description will be given of such components. A screen 107 shown in FIG. 10C is a change point display screen when the safety output is turned to OFF in response to the OFF signal from the light curtain connected to the port A. A display 104*a* shows the current signal state of each port as ON or OFF. A display 104*b* shows a change in signal at each port at timing when the safety output is turned to OFF. Furthermore, a screen 108 shown in FIG. 10D is a screen showing a cause of the light curtain being turned to OFF. The MCU 23*a* displays that an error has been detected on, for example, the 11th optical axis of the light curtain as shown on a display 106 based on the state information included in the history information stored in the memory 25*a*.

<Flowchart>

Figure 11:
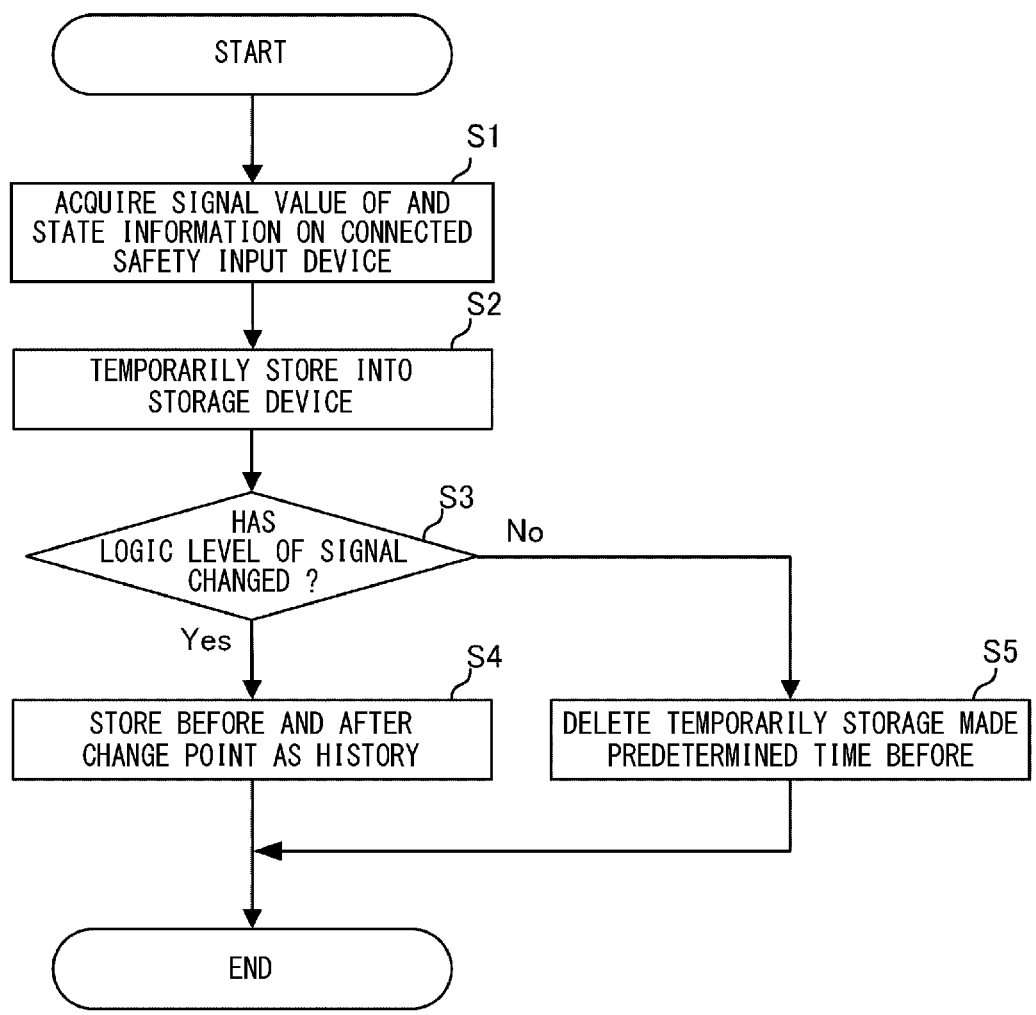
FIG. 11 is a flowchart showing a processing procedure for storing information from a safety input device as history information.

FIG. 11 is a flowchart showing a processing procedure for storing information from the safety input device connected via the compatible port 9 as the history information. A process described below is implemented via a program stored in the memory 25*a* and executed by the MCU 23*a*. Note that a description will be given below of a process for one safety input device. Therefore, the following process is executed for each connected safety input device. A process for the safety input device connected to the extension module 4 may be executed in the same manner by the extension module 4, or alternatively, may be executed by batch by the safety controller 3.

In S1, the MCU 23*a* acquires the signal value and the state information from the safety input device connected to the safety controller 3 via the compatible port 9. This acquisition is periodically made while the safety controller system 1 is in operation. Subsequently, in S2, the MCU 23*a* temporarily stores, into the memory 25*a*, the signal value and the state information acquired from the safety input device together with time information. The memory used as a temporary storage here is not limited to the memory 25*a*, and may be a memory provided separately. As described above, S1 and S2 are executed periodically.

Next, in S3, the MCU 23*a* determines whether a logic level of a signal has changed. The signal here basically indicates a logic level of a predetermined safety output signal. Note that if a memory space is not tight, a change in logic level of the safety input signal in addition to the safety output signal may be added as a condition. A change in logic level of the signal causes the process to proceed to S4, otherwise proceeds to S5.

In S4, when a change in the safety output signal has occurred, the MCU 23a stores, as the history information, the information temporarily stored in S2 before and after the change point (timing) with the information associated with the signal value and the state information in the memory 25a, and brings the process to an end. On the other hand, in S5, when no change has occurred at the determination timing in S3, the MCU 23a deletes the signal and the state information temporarily stored a predetermined time before in S2 as unnecessary data, and brings the process to an end. The predetermined time described above can be optionally changed in a manner that depends on the memory space. Further, the MCU 23a uses the time information stored together with the signal value and the state information in S2 to determine whether the signal value and the state information were stored the predetermined time before. In this way, keeping the information before and after a change point as the history information allows effective use of a memory resource and allows information of high importance to be stored. Note that the example of storage in the memory 25a has been described, but the information may be stored in the memory 25b of the extension module 4, or alternatively, may be sent to an external device and stored in the external device. The storage in the other memory may be made when the memory 25a has a memory shortage.

Figure 12:
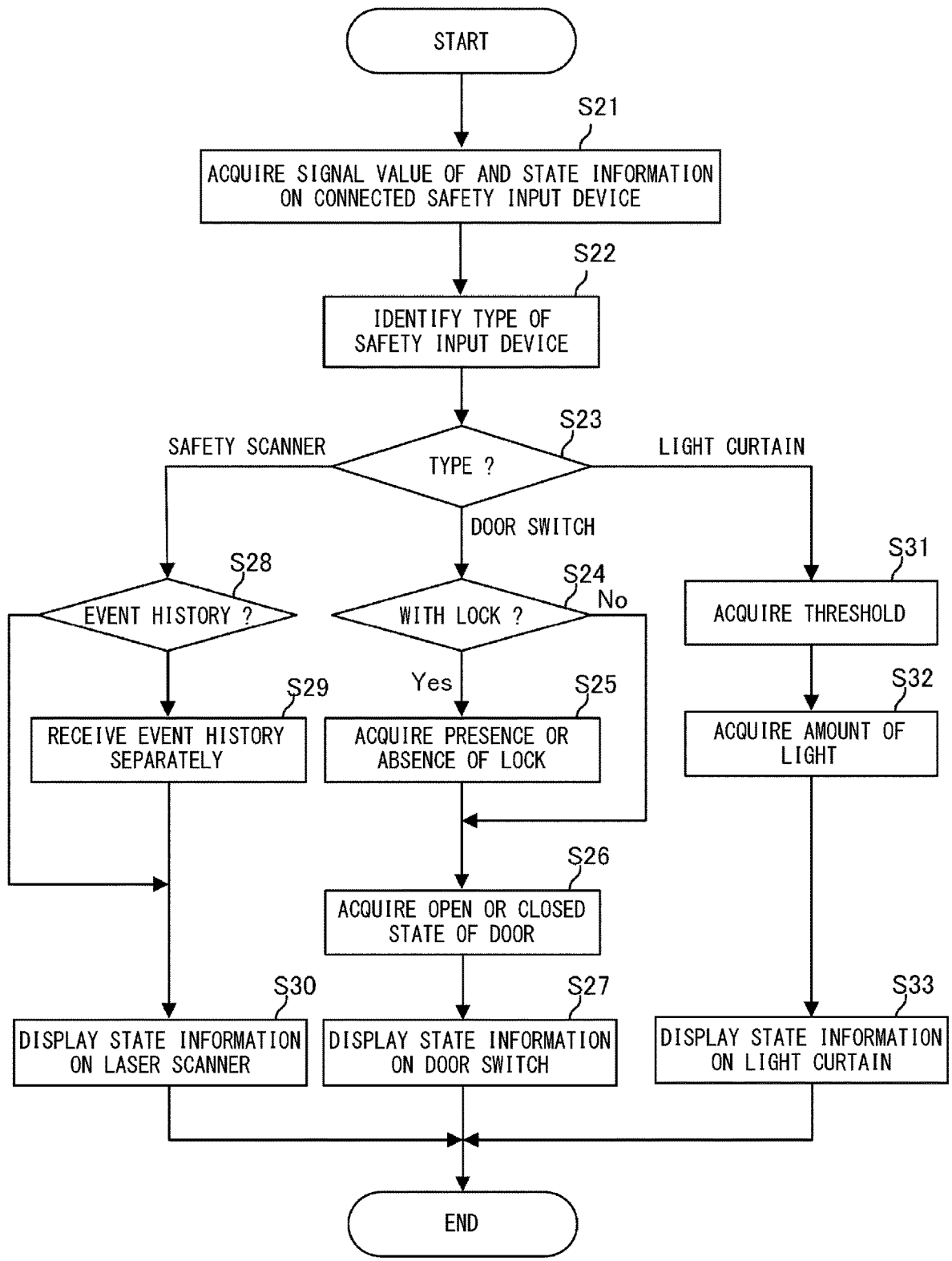
FIG. 12 is a flowchart showing a processing procedure for displaying information from the safety input device.

FIG. 12 is a flowchart showing a processing procedure for acquiring information from the safety input device connected via the compatible port 9 and displaying the state output screen. A process described below is implemented via a program stored in the memory 25a and executed by the MCU 23a. Note that a process described below may be started at timing when any safety input device is connected to the compatible port 9 or when an instruction for displaying the state output screen of the safety input device connected to a predetermined port (herein, the compatible port 9) is given in accordance with user input. Alternatively, the process may be started when a predetermined event such as an emergency stop or an abnormal state occurs.

In S21, the MCU 23a acquires the signal value, the state information, and the like from the safety input device connected via the compatible port 9. Subsequently, in S22, the MCU 23a identifies a type of the safety input device based on the information acquired in S21. For example, the MCU 23a identifies the type of the safety input device based on identification information included in the acquired information. Herein, the type of the safety input device indicates a door switch, a light curtain, a safety scanner, or the like. The MCU 23a generates a suitable state output screen in accordance with the type.

Next, in S3, the MCU 23a determines the identified type. A description will be given here on the assumption that three safety input devices, a door switch, a light curtain, and a safety scanner, are connected via the compatible port 9, but practically, more safety input devices may be connected. A safety input device of other type may be connected. When the safety input device is the door switch, the process proceeds to S24, when the safety input device is the light curtain, the process proceeds to S31, and when the safety input device is the safety scanner, the process proceeds to S28.

In S24, the MCU 23a determines whether there is a door switch with a lock. When there is a door switch with a lock, the process proceeds to S25, otherwise proceeds to S26. In S25, the MCU 23a acquires the lock state of the door switch with a lock among at least one connected door switch, and proceeds to S26. In S26, the MCU 23a acquires the open or closed state of a door monitored by each door switch. Note that the acquisition processes in S25 and S26 may be a process where the information acquired in S21 extracts predetermined information, or where the predetermined information is acquired again from the safety input device. The same applies to the subsequent acquisition process. Then, in S27, the MCU 23a displays the state information on the door switch in accordance with the acquired information, as described with reference to FIGS. 7A to 7C. Note that, upon receipt of a termination operation in accordance with user input, the display is terminated.

On the other hand, when the safety input device is determined to be the safety scanner in S23, the MCU 23a determines in S28 whether to acquire event history from the safety scanner again. The event history corresponds to, for example, history information on detection of an entry of an object by the safety sensor. The information received in S21 may include information showing whether the history information is held in the safety sensor. When the history information is held, the process proceeds to S29. Alternatively, when an instruction for acquiring the event history is given in accordance with user input, the process may proceed to S29. Otherwise, the process proceeds to S30. In S29, the MCU 23a acquires information on the event history from the safety scanner, and proceeds to S30. In S30, the MCU 23a may display, when there is an event history, the event history, and display the current camera image or scan image as the state information acquired in S21. On the other hand, when there is no event history, the MCU 23a displays the current camera image or scan image. The event history may be displayed in any form. For example, detected time information or range information may be displayed alone or together with the camera image or scan image acquired at that time. Note that, upon receipt of a termination operation in accordance with user input, the display is terminated. Further, for the safety scanner, contents to be displayed may be changed in a manner that depends on the capability of the display device 5a. For example, when the camera image or scan image cannot be displayed, only the detection information from the laser scanner may be displayed.

Further, when the safety input device is determined to be the light curtain in S23, the MCU 23a extracts, in S31, the thresholds 54, 55 from the information acquired in S21. Subsequently, in S32, the MCU 23a acquires the amount of light of each optical axis of the light curtain from the information acquired in S21. Then, in S33, the MCU 23a generates the state output screen for the light curtain and displays the state output screen on the display device 5a, as described with reference to FIGS. 5A to 5C. Note that, upon receipt of a termination operation in accordance with user input, the display is terminated. Herein, the example where the information acquired in real time is displayed has been described, but the state output screen may be generated and displayed using the state information held in the memory 25a of the safety controller 3 or the like. In such a case, since the device type has already been identified, S21 and S22 are skipped.

<Function of MCU>

Figure 13:
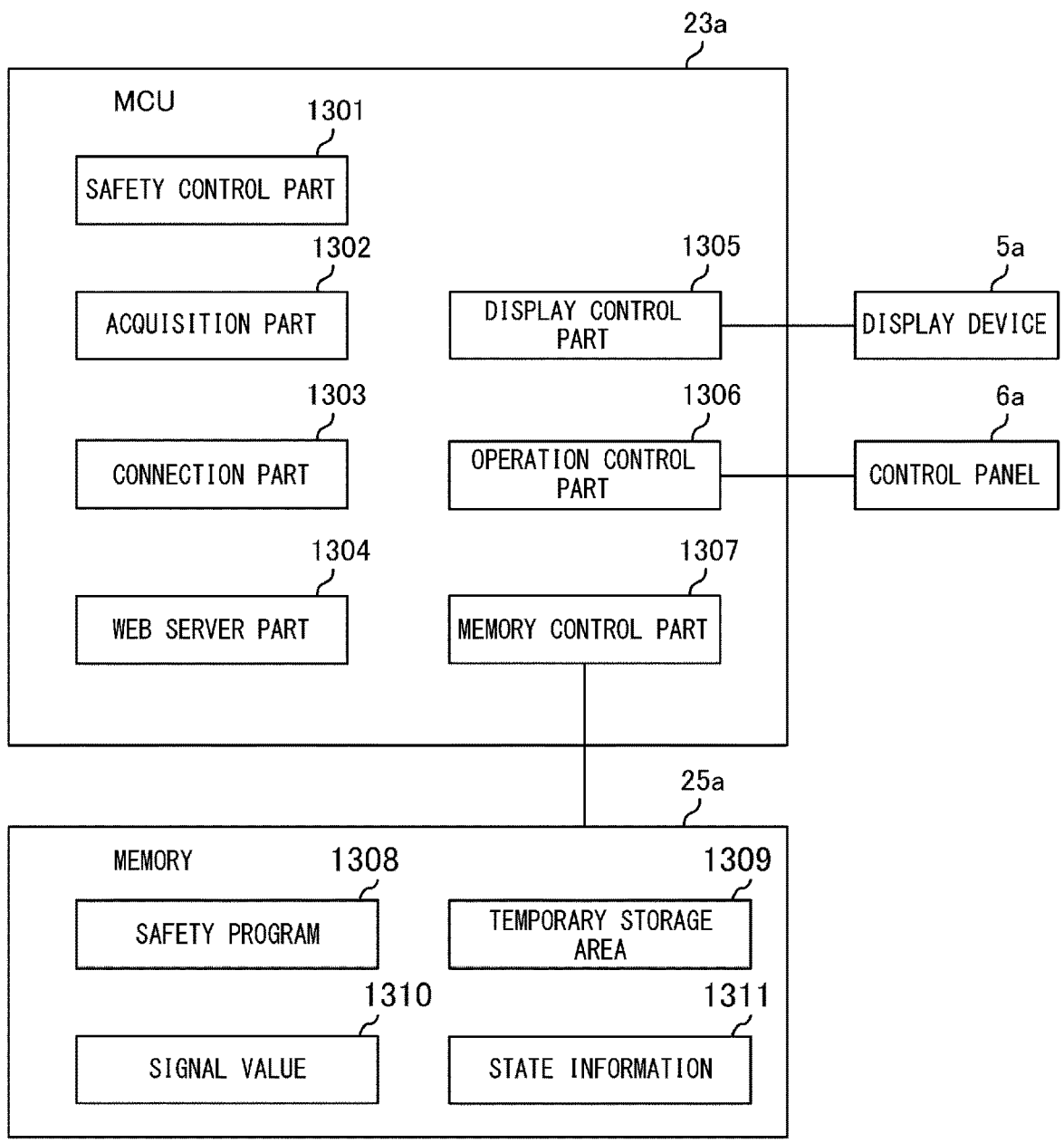
FIG. 13 is a diagram for describing functions of an MCU of the safety controller.

FIG. 13 shows various functions implemented via a program stored in the memory 25a and executed by the MCU 23a. Examples of the program to be executed here include the safety program, and a program for implementing the above-described processes peculiar to the present invention. The program may be a program created as a built-in program in the safety program, or may be a program to be executed as a subroutine that is called from the safety program. The MCU 23a includes, as functional components, a safety control part 1301, an acquisition part 1302, a connection part 1303, a web server part 1304, a display control part 1305, an operation control part 1306, and a memory control part 1307.

The safety control part 1301 executes the safety program stored in the memory 25a to perform safety control on the safety controller system 1 to be described later. The acquisition part 1302 periodically acquires the signal value and state information from the connected safety input device. The acquisition part 1302 may further acquire information on the safety input device connected to the extension module 4. This acquisition is made via each module. The connection part 1303 controls the compatible port 9 and the IO connector 10a for connection control of each port.

The display control part 1305 controls the display on the display device 5a as shown in the above-described screen examples. The display control part 1305 may generate a screen to be displayed on the display device 5a based on information acquired in real time from the safety input device, or may generate a screen based on the history information stored in the memory 25a or the like. Further, the display control part 1305 determines a type of the safety input device based on the information acquired from the safety input device, and displays the state output screen in accordance with the type. Upon receipt of user input via the control panel 6a, the operation control part 1306 transmits the user input to the display control part 1305. The display control part 1305 controls a screen transition in accordance with the user input. As described with reference to FIG. 11, the memory control part 1307 performs control to store the information acquired from the safety input device by the acquisition part 1302 into a temporary storage area 1309 or store the information as genuine history information into the memory. Further, the memory control part 1307 reads the history information in accordance with a user operation and passes the information to the display control part 1305.

The web server part 1304 performs control when the safety controller 3 serves as a web server. In the present embodiment, the example where the state information is output to the display device 5a of the safety controller 3 has been described, but the information may be displayed by a web client that is an external device. In this case, the web server part 1304 generates a display screen from the information acquired from the safety input device in real time or the history information, and sends the display screen to the web client. Note that the safety controller 3 is a small device adapted to an installation environment or the like, which restricts the display capability of the display device 5b. Therefore, the screen may be generated as a user interface richer than the above-described display example for the web client such as the PC 2 having a more sophisticated display. Although the example where the state information on the light curtain or the door switch is output has been described above, the same applies to a scan image or a camera image captured by a scanner or a camera (safety scanner) that requires a more sophisticated display to output the state information. For example, the web server part 1304 may send the scan image or the camera image captured by the scanner or the camera to the web client to display the scan image or the camera image. It is needless to say that the scan image or the camera image may be displayed on the display part of the safety controller 3 in a manner that depends on the display capability of the display device 5a. Further, instead of the use of the web client, the web server part 1304 may return the image generated from the state information to the safety input device to cause the safety input device to output the state information.

The memory 25a includes a safety program 1308, a temporary storage area 1309, a signal value 1310, and state information 1311. The safety program 1308 is a program edited by the PC 2, transferred, and stored, and is for implementing safety control on the safety controller system 1. The temporary storage area 1309 is an area where the signal value and state information acquired from the safety input device are temporarily stored. The temporary storage area may be provided in a memory different from the memory 25a. The signal value 1310 and the state information 1311 correspond to the genuine history information stored based on the information stored in the temporary storage area 1309. These pieces of information are stored in association with each other.

<Topology of Safety Controller>

Figure 14:
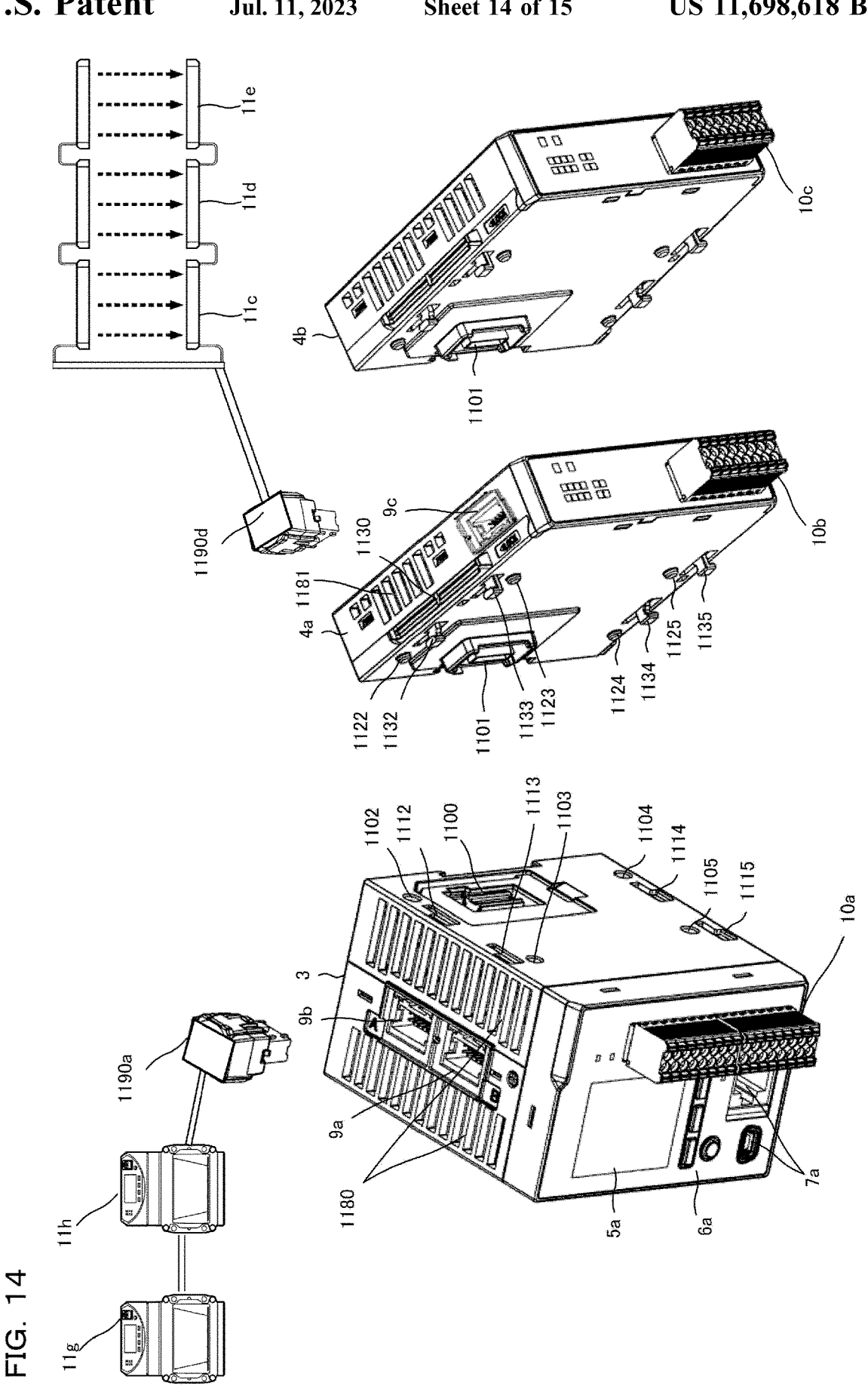
FIG. 14 is a perspective view of the safety controller.
Figure 15:
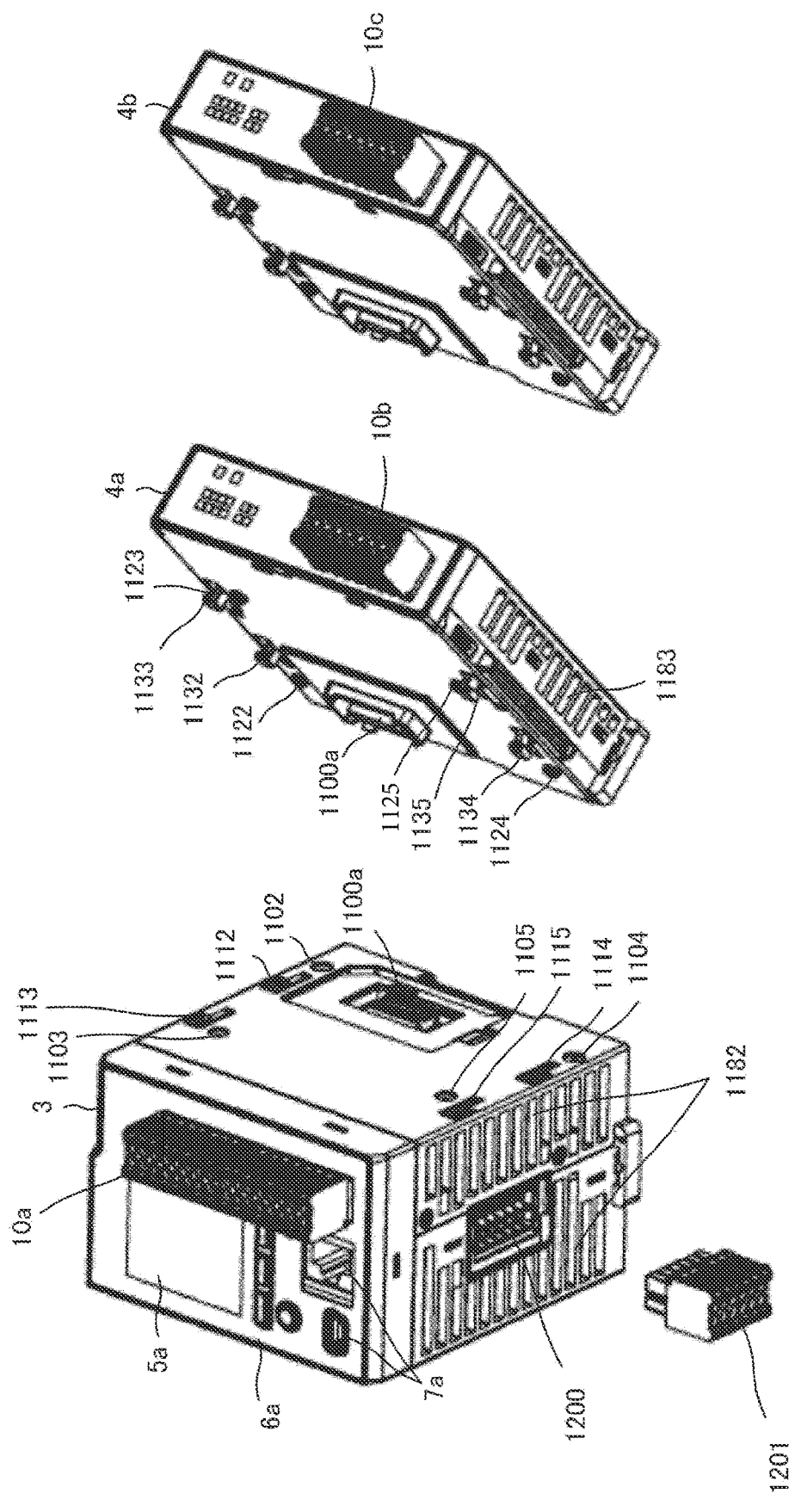
FIG. 15 is a perspective view of the safety controller.

FIGS. 14 and 15 are perspective views of the safety controller. As shown in FIG. 14, the compatible ports 9a, 9b are provided on the upper surface of the safety controller 3. A port connector 1190a provided at a tip of a cable extending from the safety input device 11 such as the safety laser scanner is connectable to the compatible ports 9a, 9b. A compatible port 9c is provided on the upper surface of the extension module 4a in the same manner. A port connector 1190d provided at a tip of a cable extending from the safety input device 11 such as the light curtain is connectable to the compatible port 9c.

On a right surface of the safety controller 3, a receptacle 1100 for the bus IF 26a is provided. On a left surface of the extension module 4a, a bus connector 1101 for the bus IF 26b is provided. Connecting the bus connector 1101a and the receptacle 1100 causes the bus IFs 26a, 26b to be communicably connected to each other (connection via an internal bus).

On the right surface of the safety controller 3, boss grooves 1102, 1103, 1104, 1105 are provided. On the left surface of the extension module 4a, positioning bosses 1122, 1123, 1124, 1125 are provided. When the extension module 4a is connected to the safety controller 3, the bosses 1122, 1123, 1124, 1125 fit into the boss grooves 1102, 1103, 1104, 1105, respectively, so as to position the extension module 4a relative to the safety controller 3.

On the right surface of the safety controller 3, locking grooves 1112, 1113, 1114, 1115 are provided. On the left surface of the extension module 4a, hooks 1132, 1133, 1134, 1135 are provided. When the extension module 4a is securely fixed to the safety controller 3, the hooks 1132, 1133, 1134, 1135 fit into the locking grooves 1112, 1113, 1114, 1115, respectively. Note that the hooks 1132, 1133, 1134, 1135 have a lever 1130 that is provided on the upper surface of the extension module 4a and is movable in a front-rear direction. Moving the lever 1130 causes the hooks 1132, 1133, 1134, 1135 to move rearward to apply a lock. Moving the lever 1130 causes the hooks 1132, 1133, 1134, 1135 to move forward to release the lock.

A right surface of the extension module 4a is identical in structure to the right surface of the safety controller 3, and therefore no description will be given of the structure. The extension module 4b is identical in structure to the extension module 4a, and therefore no description will be given of the structure. Since a common structure is applied to these connection surfaces, it is possible to connect the left surface of the extension module 4b to the right surface of the extension module 4a.

As shown in FIG. 15, on the lower surface of the safety controller 3, a remote IO receptacle 1200 is provided. To the remote IO receptacle 1200, a remote IO connector 1201 provided at a tip of a cable extending from the remote IO unit is connected. The remote IO unit is a unit for connecting, to the safety controller 3, a safety input device or a safety output device located away from the safety controller 3.

In the meantime, the safety controller 3 and the extension modules 4a, 4b do not have sufficient free space left on their respective rear surfaces, front surfaces, right surfaces, and left surfaces due to a basic use as the safety controller. For example, the rear surfaces of the safety controller 3 and the extension modules 4a, 4b each have a connection groove or a backplane for connection to a DIN rail. A display surface, an I/O connector, and the like are present on the front surfaces of the safety controller 3 and the extension module 4. On the left and right surfaces, receptacles and the like for the bus IF 26a are placed. Therefore, there is no space for installing another port on these surfaces.

Therefore, the upper and lower surfaces of the safety controller 3 and the extension module 4 can be considered as places for installing another port. On the upper or lower surfaces of the safety controller 3 and the extension module 4, the remote IO receptacle 1200 for the compatible ports 9b, 9c or the remote IO port may be provided.

When heat-dissipating holes 1180, 1181, 1182, 1183 are provided on both the upper and lower surfaces of the safety controller 3 and the extension modules 4a, 4b, only a small space is left. In this case, only a limited space is available for placement of another port. Therefore, for example, the compatible ports 9b, 9c may be placed on the upper surfaces of the safety controller 3 and the extension module 4, and the remote IO receptacle 1200 for the remote IO port may be provided on the lower surfaces of the safety controller 3 and the extension module 4 (vertically-distributed placement). Alternatively, the remote IO receptacle 1200 for the remote IO port may be provided on the upper surfaces of the safety controller 3 and the extension module 4, and the compatible ports 9b, 9c may be provided on the lower surfaces of the safety controller 3 and the extension module 4.

SUMMARY

The safety controller 3 according to the present invention acquires the compatible port 9 that connects at least one safety input device, and a safety input signal from the at least one safety input device connected via the compatible port 9 and state information on the safety input device. Further, the safety controller 3 includes the MCU 23 that generates, in accordance with the safety program, a safety output signal based on the safety input signal acquired, and the display device 5a that displays, based on the state information acquired, a state of the safety input device from which the state information is acquired. Accordingly, the safety controller 3 according to the present invention is capable of displaying, not only the signal value of the safety input device connected, but also the state information on the safety input device such as the amount of light received of each optical axis of a light curtain, the lock state of cascade-connected door switches or the open or closed state of a door, or the scan image captured by a safety scanner, and the like. Therefore, the present invention can provide a mechanism for causing the safety controller to suitably display various pieces of information from the safety input device.

The safety controller 3 further includes the memory 25a that stores the information acquired from the safety input device as the history information, and the display device 5a can display past information. This allows the worker to easily analyze a cause of the safety output signal being turned to OFF or the like. Note that the memory 25a may store a signal in a predetermined period from before to after a logic level of the safety output signal is switched. Thus, according to the present invention, it is possible to suitably hold various pieces of information from the safety input device as the history information without increasing the memory resource of the safety controller, and provide information of high importance (information before and after the safety output changes to OFF).

Further, the safety controller 3 may send display information generated based on the information acquired from the safety input device to the safety input device. Alternatively, the safety controller 3 may serve as a web server that sends the display information to an external device to display the display information. In this case, depending on the display capability of the external device, a user interface richer than the user interface displayed on the main body may be implemented.

Further, the display device 5a is characterized by being provided in a part of the housing of the safety controller (FIGS. 1 and 4). Accordingly, the state information on the safety input device can be displayed on the display part provided in the housing of the safety controller 3, and the status of each place can be easily checked on site, thereby allowing the system to be reworked or reset efficiently.

Further, the compatible port 9 connectable with at least the signal line and the communication line is applied as a connection unit according to the present invention. The safety controller 3 acquires the safety input signal over the signal line and acquires the state information over the communication line. Furthermore, the compatible port 9 may be a port connectable with a cable capable of supplying power in addition to the signal line and the communication line. The safety controller 3 may further include the IO connector 10a that is a port connectable with the signal line, as another connection unit that connects at least one safety input device (FIG. 1). The safety controller 3 acquires the safety input signal from the safety input device connected via the IO connector 10a over the signal line. The display device 5a displays, for the safety input device connected to the IO connector 10a, the safety input signal acquired in a distinguishable manner without displaying the state of the safety input device. Note that the signal line may be a dual-redundant ON/OFF cable. As described above, the safety controller 3 according to the present invention includes the compatible port 9 capable of acquiring the state information on the safety input device in addition to the normal IO connector 10a, and therefore can display richer information provided on the display device provided in a part of the housing of the safety controller 3.

The invention is not limited to the above-described embodiment, and various modifications or changes may be made within the scope of the invention.

What is claimed is:
1. A safety controller that executes a safety program, the safety controller comprising:
a port connector including a communication line detachably connected to at least one first safety input device;
an IO connector including an ON/OFF input terminal detachably connected to at least one second safety input device;
an acquisition unit that acquires a first safety input signal and state information from the at least one first safety input device connected via the port connector, and acquires a second safety input signal from the at least one second safety input device connected via the ON/OFF input terminal;

an execution engine that generates, in accordance with the safety program transmitted as a user created program from an external device, a safety output signal based on the first safety input signal and the second safety input signal acquired by the acquisition unit; and a display unit that displays, based on the state information acquired over the communication line by the acquisition unit, a state of the safety input device from which the state information is acquired.

2. The safety controller according to claim 1, further comprising a storage unit that stores the state information acquired by the acquisition unit, wherein the display unit displays, as the state of the safety input device, a corresponding past state of the safety input device from the state information stored in the storage unit.

3. The safety controller according to claim 2, wherein the display unit displays the state of the safety input device at timing when a logic level of the safety output signal is switched.

4. The safety controller according to claim 2, wherein the display unit displays the state of the safety input device before and after a logic level of the safety output signal is switched.

5. The safety controller according to claim 2, wherein the storage unit stores a signal in a predetermined period from before to after a logic level of the safety output signal is switched.

6. The safety controller according to claim 1, wherein
at least one safety output device is further connected to the port connector, and
the display unit further displays output of the at least one safety output device.

7. The safety controller according to claim 1, further comprising a notification unit that provides notification of an error or a warning in accordance with the state information.

8. The safety controller according to claim 1, wherein the display unit displays, when the safety input device is a light curtain, an amount of light received of each optical axis of the light curtain in a distinguishable manner based on the state information.

9. The safety controller according to claim 8, wherein the display unit further displays, in a distinguishable manner, a threshold of the amount of light received at which the notification of a warning is provided.

10. The safety controller according to claim 1, wherein the display unit displays, when the safety input device is a door switch, a lock state of the door switch based on the state information.

11. The safety controller according to claim 10, wherein the display unit displays, when a plurality of the door switches are cascade-connected, lock states of all doors.

12. The safety controller according to claim 1, wherein the display unit identifies a type of the safety input device from information acquired by the acquisition unit, and provides a display in accordance with the type identified.

13. The safety controller according to claim 1, further comprising a sending unit that sends display information on the state of the safety input device to the safety input device.

14. The safety controller according to claim 13, wherein the sending unit further sends the display information on the state of the safety input device to an external device and serves as a web server.

15. The safety controller according to claim 1, wherein the display unit is provided in a part of a housing of the safety controller.

16. The safety controller according to claim 1, wherein
the port connector is a port connectable with at least a signal line and the communication line, and
the acquisition unit acquires the safety input signal over the signal line and acquires the state information over the communication line.

17. The safety controller according to claim 16, wherein the port connector is a port connectable with a cable capable of supplying power in addition to the signal line and the communication line.

18. The safety controller according to claim 16, further comprising an other port connector that connects to an other at least one safety input device, the other port connector being a port connectable with the signal line, wherein
the acquisition unit acquires a safety input signal from the other at least one safety input device connected via the other port connector over the signal line, and
the display unit displays, for the safety input device connected to the other port connector, the safety input signal acquired by the acquisition unit in a distinguishable manner without displaying a state of the other at least one safety input device.

19. The safety controller according to claim 16, wherein the signal line is a dual-redundant ON/OFF cable.

* * * * *